(12) United States Patent
Oh et al.

(10) Patent No.: US 12,401,054 B2
(45) Date of Patent: Aug. 26, 2025

(54) SYSTEM AND METHOD FOR PRESSURIZING ALL-SOLID-STATE SECONDARY BATTERY AT HIGH TEMPERATURE

(71) Applicant: HANA TECHNOLOGY CO., LTD., Yongin-si (KR)

(72) Inventors: Tae Bong Oh, Suwon-si (KR); Souk Woo Lee, Hwaseong-si (KR); Oh Chul Kwon, Seoul (KR); Jung Ho Song, Suwon-si (KR); Seung A Han, Seoul (KR); Sang Rae Kim, Yongin-si (KR); Seung Kyu Han, Ansan-si (KR); Ji Hyeon Yun, Changwon-si (KR)

(73) Assignee: HANA TECHNOLOGY CO., LTD., Yongin-si (KR)

( * ) Notice: Subject to any disclaimer, the term of this patent is extended or adjusted under 35 U.S.C. 154(b) by 189 days.

(21) Appl. No.: 18/152,689

(22) Filed: Jan. 10, 2023

(65) Prior Publication Data

US 2023/0223578 A1     Jul. 13, 2023

(30) Foreign Application Priority Data

Jan. 12, 2022   (KR) ................... 10-2022-0004393
Jul. 21, 2022   (KR) ................... 10-2022-0090218

(51) Int. Cl.
*H01M 10/04*      (2006.01)
*H01M 4/04*       (2006.01)
*H01M 10/0585*    (2010.01)

(52) U.S. Cl.
CPC ....... *H01M 10/0404* (2013.01); *H01M 4/043* (2013.01); *H01M 10/0481* (2013.01); *H01M 10/0585* (2013.01)

(58) Field of Classification Search
None
See application file for complete search history.

(56) References Cited

U.S. PATENT DOCUMENTS

2014/0162115 A1*  6/2014  Otomo ............... H01M 50/258
                                                29/623.2
2020/0168959 A1   5/2020  Hettrich

FOREIGN PATENT DOCUMENTS

JP       2010034002 A   *  2/2010
JP       2010198933 A      9/2010
KR    10-2015-0069523 A    6/2015
(Continued)

OTHER PUBLICATIONS

Translation of JP-2010034002-A (Year: 2010).*

*Primary Examiner* — Jonathan G Leong
*Assistant Examiner* — Taeyoung Son
(74) *Attorney, Agent, or Firm* — Bridgeway IP Law Group, PLLC; Jihun Kim

(57) ABSTRACT

Proposed are a system and a method for pressurizing an all-solid-state secondary battery at high temperature. More particularly, proposed are a system and a method for pressurizing an all-solid-state secondary battery at high temperature, in which a pre-process of high-temperature pressurization for maximizing a contact interface between a solid electrolyte and an active material and minimizing interfacial resistance is automated in such a manner that the fed secondary battery is automatically packed through a vacuum sealing unit and then pressurized at high temperature, thereby shortening a tact time and thus increasing process efficiency.

15 Claims, 20 Drawing Sheets

(56) References Cited

FOREIGN PATENT DOCUMENTS

| | | |
|---|---|---|
| KR | 10-2020-0024724 A | 3/2020 |
| KR | 10-2020-0037601 A | 4/2020 |
| KR | 10-2021-0096269 A | 8/2021 |
| KR | 10-2021-0113027 A | 9/2021 |
| KR | 1020220095324 A | 7/2022 |

* cited by examiner

SYSTEM AND METHOD FOR PRESSURIZING ALL-SOLID-STATE SECONDARY BATTERY AT HIGH TEMPERATURE

CROSS REFERENCE TO RELATED APPLICATION

The present application claims priority to Korean Patent Application No. 10-2022-0004393, filed Jan. 12, 2022, and No. 10-2022-0090218, filed Jul. 21, 2022, the entire contents of which is incorporated herein for all purposes by this reference.

BACKGROUND OF THE INVENTION

Field of the Invention

The present disclosure relates generally to a system and a method for pressurizing an all-solid-state secondary battery at high temperature. More particularly, the present disclosure relates to a system and a method for pressurizing an all-solid-state secondary battery at high temperature, in which a pre-process of high-temperature pressurization for maximizing a contact interface between a solid electrolyte and an active material and minimizing interfacial resistance is automated in such a manner that the fed secondary battery is automatically packed through a vacuum sealing unit and then pressurized at high temperature, thereby shortening a tact time and thus increasing process efficiency.

Description of the Related Art

Recently, as the development of electric vehicles, energy storage batteries, robots, satellites, and the like has been accelerated, various studies have been conducted on high-performance secondary batteries capable of being repeatedly charged and discharged. Currently commercialized secondary batteries include nickel cadmium batteries, nickel metal hydride batteries, nickel zinc batteries, lithium secondary batteries, and the like. Of these, lithium secondary batteries have attracted much attention because they have almost no memory effect compared to nickel-based batteries and thus can be discharged and charged freely. Advantageously, the lithium secondary batteries also have extremely low self-discharge rate and high energy density.

Such lithium secondary batteries generally include a lithium-based oxide and a carbon material as a positive electrode active material and a negative electrode active material, respectively. Lithium secondary batteries include an electrode assembly in which a positive electrode plate and a negative electrode plate respectively coated with a positive electrode active material and an negative electrode active material are disposed with a separator being interposed therebetween, and a pouch, that is, a battery casing, in which the electrode assembly and an electrolyte are sealed and accommodated.

All-solid-state secondary batteries are secondary batteries in which their main materials are all solid. Since a solid electrolyte is used, the risk of fire and explosion can be significantly reduced, broadening the range of applications. Also, since lithium metal, which was difficult to apply in conventional lithium secondary batteries due to the risk of fire and explosion despite its excellent performance, is used as a negative electrode material, the energy density can be dramatically increased. Due to these advantages, the development of all-solid-state secondary batteries is being under active progress.

In the case of the solid electrolyte of the all-solid-state secondary batteries, since the movement of ions is confined within a solid lattice, the interface resistance has to be minimized while maximizing a contact interface between the active materials and the electrolyte. To this end, the all-solid-state secondary batteries have been manufactured by a conventional method of stacking solid electrolyte layers and then applying pressure with a hydraulic press. However, the problem of the all-solid-state secondary batteries thus manufactured is that they are not suitable for mass production.

To overcome the above problem, the inventors of the present disclosure have proposed a novel system for pressurizing an all-solid-state secondary battery at a high-temperature with an improved structure/method, which will be described in detail later.

The foregoing is intended merely to aid in the understanding of the background of the present disclosure, and is not intended to mean that the present disclosure falls within the purview of the related art that is already known to those skilled in the art.

DOCUMENTS OF RELATED ART (Patent document 1) Korean Patent Application Publication No. 10-2015-0069523 "All-solid secondary battery and method of preparing all-solid secondary battery"

SUMMARY OF THE INVENTION

Accordingly, the present disclosure has been made keeping in mind the above problems occurring in the related art, and an objective of the present disclosure is to provide a system and a method for pressurizing an all-solid-state secondary battery at high temperature, in which a pre-process of high-temperature pressurization for maximizing a contact interface between a solid electrolyte and an active material and minimizing interfacial resistance is automated in such a manner that the fed secondary battery is automatically packed through a vacuum sealing unit and then pressurized at high temperature, thereby shortening a tact time and thus increasing process efficiency.

Another objective of the present disclosure is to provide a system and a method for pressurizing an all-solid-state secondary battery at high temperature, in which the secondary battery supplied from a supply part is automatically stacked on a buffer through a feeding unit, thereby buffering a difference in operating time between a first transfer unit and an automatic packing unit.

Another objective of the present disclosure is to provide a system and a method for pressurizing an all-solid-state secondary battery at high temperature, in which the secondary battery is packed into or unpacked from a vacuum sealing unit through a first supply device, thereby protecting the secondary battery from a fluid, which serves as a pressure transmitting medium, during a high-temperature pressurization process.

Another objective of the present disclosure is to provide a system and a method for pressurizing an all-solid-state secondary battery at high temperature, in which a vacuum is formed in an inner space of a vacuum sealing unit through a vacuum device, thereby preventing defects in the secondary battery during a high-temperature pressurization process.

Another objective of the present disclosure is to provide a system and a method for pressurizing an all-solid-state secondary battery at high temperature, in which a pair of automatic packing units are provided so that when one automatic packing unit performs an automatic packing process for the secondary battery, the remaining automatic packing unit performs an automatic unpacking process for the secondary battery having been subjected to a pressurization process, thereby increasing process efficiency.

Another objective of the present disclosure is to provide a system and a method for pressurizing an all-solid-state secondary battery at high temperature, in which a vessel into which a basket is inserted is laterally moved into an inner space of a pressurizing chamber part and pressurized at high temperature, thereby maximizing a contact interface and minimizing interface resistance of the all-solid-state secondary battery.

Another objective of the present disclosure is to provide a system and a method for pressurizing an all-solid-state secondary battery at high temperature, in which a pair of vessels are provided on left and right sides of a pressurizing chamber part so that when one vessel having been subjected to a pressurization process is discharged from an inner space of the pressurizing chamber part and returned to a standby position, the remaining vessel in standby is directly inserted into the inner space of the pressurizing chamber part, thereby reducing process time and thus increasing process efficiency.

Another objective of the present disclosure is to provide a system and a method for pressurizing an all-solid-state secondary battery at high temperature, in which a first heating block is provided on one side of a pressurizing unit such as a pressurizing chamber part or a vessel, thereby minimizing heat loss of a pressure transmitting medium when the medium is supplied to an inner space of the pressurizing chamber part.

Another objective of the present disclosure is to provide a system and a method for pressurizing an all-solid-state secondary battery at high temperature, in which a second heating block is provided on one side of a storage tank for storing a fluid, which serves as a pressure transmitting medium, so that the fluid is supplied in a high temperature state to a pressurizing chamber part, thereby increasing process efficiency.

Another objective of the present disclosure is to provide a system and a method for pressurizing an all-solid-state secondary battery at high temperature, in which a heating jacket is provided on an outer surface or outer circumferential surface of a pipe part, thereby minimizing heat loss that may occur when a pressure transmitting medium flows from a storage tank to a pressurizing chamber part.

Another objective of the present disclosure is to provide a system and a method for pressurizing an all-solid-state secondary battery at high temperature, in which a residue discharge pipe communicates with an inner space of a pressurizing chamber part through a second communication hole, thereby efficiently discharging a fluid remaining in the inner space after a pressurization process.

In order to achieve the above objectives, according to one aspect of the present disclosure, there is provided a system for pressurizing an all-solid-state secondary battery at high temperature, the system including: a first transfer unit configured to transfer a basket in forward and backward directions; a basket configured to accommodate the all-solid-state secondary battery in an inner space thereof; a vessel connected to a pressurizing chamber part on one side thereof, and configured to be moved laterally into an inner space of the pressurizing chamber part or moved laterally in an opposite direction to a standby position, the vessel including an inlet configured to allow the basket to be inserted therein by the first transfer unit and an outlet configured to allow the inserted basket to be discharged therefrom; the pressurizing chamber part having the inner space configured to allow the vessel to be inserted therein; a storage tank configured to store a fluid serving as a pressure transmitting medium; and a pipe part having a first end connected to the storage tank and a second end connected to the pressurizing chamber part.

According to another aspect of the present disclosure, the pressurizing chamber part may include: a first cover configured to open and close the inlet of the inserted vessel; and a second cover configured to open and close the outlet of the inserted vessel.

According to another aspect of the present disclosure, the pressurizing chamber part may further include: a first through-hole configured to allow the fluid to be supplied into and discharged from the inner space of the pressurizing chamber part; and a second through-hole configured to allow the fluid to be supplied into and discharged from the inner space of the pressurizing chamber part, and the pipe part may include: a first pipe having a first end in communication with the storage tank and a second end in communication with the first through-hole; and a second pipe having a first end in communication with the storage tank and a second end in communication with the second through-hole.

According to another aspect of the present disclosure, a pre-fill pump configured to supply the fluid into or discharge the fluid from the inner space of the pressurizing chamber part may be provided on one side of the first pipe, and an intensifier pump configured to increase a pressure in the inner space of the pressurizing chamber part may be provided on one side of the second pipe.

According to another aspect of the present disclosure, the pressurizing chamber part may further include a first heating block installed inside the pressurizing chamber part and configured to transfer heat to the fluid supplied from the storage tank.

According to another aspect of the present disclosure, the pressurizing chamber part may further include a fluid flow hole configured to allow the fluid remaining after a pressurization process is completed to be discharged therethrough, and the pipe part may further include a residue discharge pipe having a first end in communication with the storage tank and a second end in communication with the fluid flow hole.

According to another aspect of the present disclosure, the storage tank may include a second heating block installed on one side of the storage tank and configured to transfer heat to the stored fluid.

According to another aspect of the present disclosure, the first pipe and the second pipe may be branched from a common pipe in communication with the storage tank, and the pipe part may further include a heating jacket on an outer surface of one side thereof.

According to another aspect of the present disclosure, the system may further include: a second transfer unit configured to transfer the fed secondary battery; a feeding unit configured to discharge the secondary battery transferred through the second transfer unit from the second transfer unit; and an automatic packing unit configured to automatically pack the secondary battery discharged through the feeding unit into a vacuum sealing unit and supply the secondary battery to the first transfer unit.

According to another aspect of the present disclosure, the automatic packing unit may include: a first supply device configured to place the secondary battery discharged through the feeding unit on a work table and automatically pack the secondary battery into the vacuum sealing unit; the work table configured to be rotated; a vacuum device configured to form a vacuum in an inner space of the packed vacuum sealing unit; and a second supply device configured to supply the vacuum sealing unit under vacuum into the basket.

According to another aspect of the present disclosure, the first supply device may be disposed adjacent to a first position on the work table, the vacuum device may be disposed adjacent to a second position on the work table, and the second supply device may be disposed adjacent to a third position on the work table.

According to another aspect of the present disclosure, the automatic packing unit may further include a vacuum release device disposed adjacent to a fourth position on the work table and configured to release the vacuum in the inner space of the vacuum sealing unit.

According to another aspect of the present disclosure, the second transfer unit may include: a supply part configured to transfer the fed secondary battery to the feeding unit; and a discharge part configured to receive the secondary battery discharged through the automatic packing unit through the feeding unit and transfer the secondary battery in a direction opposite to a transfer direction of the supply part.

According to another aspect of the present disclosure, there is provided a method of pressurizing an all-solid-state secondary battery at high temperature using a system for pressurizing an all-solid-state secondary battery at high temperature, the system including: a first transfer unit configured to transfer the fed secondary battery; a feeding unit configured to discharge the secondary battery transferred through the first transfer unit from the first transfer unit; and an automatic packing unit configured to automatically pack the secondary battery discharged through the feeding unit into a vacuum sealing unit, the automatic packing unit including: a first supply device configured to place the secondary battery discharged through the feeding unit on a work table and automatically pack the secondary battery into the vacuum sealing unit; the work table configured to be rotated; a vacuum device configured to form a vacuum in an inner space of the packed vacuum sealing unit; and a second supply device configured to supply the vacuum sealing unit under vacuum into a basket, the method including: transferring the secondary battery to the feeding unit on the first transfer unit; discharging, by the input part, the secondary battery from the first transfer unit; packing, by the first supply device, the discharged secondary battery into the vacuum sealing unit on the work table; and forming, by the vacuum device, the vacuum in the inner space of the packed vacuum sealing unit.

According to another aspect of the present disclosure, the system may further include: a second transfer unit configured to transfer the basket; and a pressurizing unit configured to supply a fluid serving as a pressure transmitting medium to the basket in which the vacuum sealing unit is accommodated so that the secondary battery is pressurized at high temperature, the pressurizing unit may include: a vessel connected to a pressurizing chamber part on one side thereof, configured to be moved laterally into an inner space of the pressurizing chamber part or moved laterally in an opposite direction to a standby position, and including an inlet configured to allow the basket to be inserted therein by the second transfer unit; and the pressurizing chamber part having the inner space configured to allow the vessel to be inserted therein, and the method may further include: inserting, by the second supply device, the vacuum sealing unit under vacuum into the basket on the second transfer unit; transferring, by the second transfer unit, the basket into which the vacuum sealing unit is inserted to the inner space of the pressurizing chamber part; and pressurizing the secondary battery in the pressurizing chamber part.

The present disclosure has the following effects by the above configuration.

By enabling a pre-process of high-temperature pressurization for maximizing a contact interface between a solid electrolyte and an active material and minimizing interfacial resistance to be automated in such a manner that the fed secondary battery is automatically packed through the vacuum sealing unit and then pressurized at high temperature, it is possible to shorten a tact time and thus increase process efficiency.

By enabling the secondary battery supplied from the supply part to be automatically stacked on the buffer through the feeding unit, it is possible to buffer a difference in operating time between the first transfer unit and the automatic packing unit.

By enabling the secondary battery to be packed into or unpacked from the vacuum sealing unit through the first supply device, it is possible to protect the secondary battery from the fluid, which serves as a pressure transmitting medium, during the high-temperature pressurization process.

By enabling a vacuum to be formed in the inner space of the vacuum sealing unit through the vacuum device, it is possible to prevent defects in the secondary battery during the high-temperature pressurization process.

By providing a pair of automatic packing units so that when one automatic packing unit performs the automatic packing process for the secondary battery, the remaining automatic packing unit performs the automatic unpacking process for the secondary battery having been subjected to the pressurization process, it is possible to increase process efficiency.

By enabling the vessel into which the basket is inserted to be laterally moved into the inner space of the pressurizing chamber part and pressurized at high temperature, it is possible to maximize a contact interface and minimize interface resistance of the all-solid-state secondary battery.

By enabling the pair of vessels to be provided on left and right sides of the pressurizing chamber part so that when one vessel having been subjected to the pressurization process is discharged from the inner space of the pressurizing chamber part and returned to the standby position, the remaining vessel in standby is directly inserted into the inner space of the pressurizing chamber part, it is possible to reduce process time and thus increase process efficiency.

By providing the first heating block on one side of the pressurizing unit such as the pressurizing chamber part or the vessel, it is possible to minimize heat loss of the pressure transmitting medium when the medium is supplied to the inner space of the pressurizing chamber part.

By providing the second heating block on one side of the storage tank for storing the fluid, which serves as a pressure transmitting medium, so that the fluid is supplied in a high temperature state to the pressurizing chamber part, it is possible to achieve increased process efficiency.

By providing a heating jacket on the outer surface or outer circumferential surface of the pipe part, it is possible to minimize heat loss that may occur when the pressure transmitting medium flows from the storage tank to the pressurizing chamber part.

By enabling the residue discharge pipe to communicate with the inner space of the pressurizing chamber part through the second communication hole, it is possible to efficiently discharge the fluid remaining in the inner space after the pressurization process.

Meanwhile, the effects of the present disclosure are not limited to the effects described above and other effects not stated directly could be understood from the following description and claims.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1:
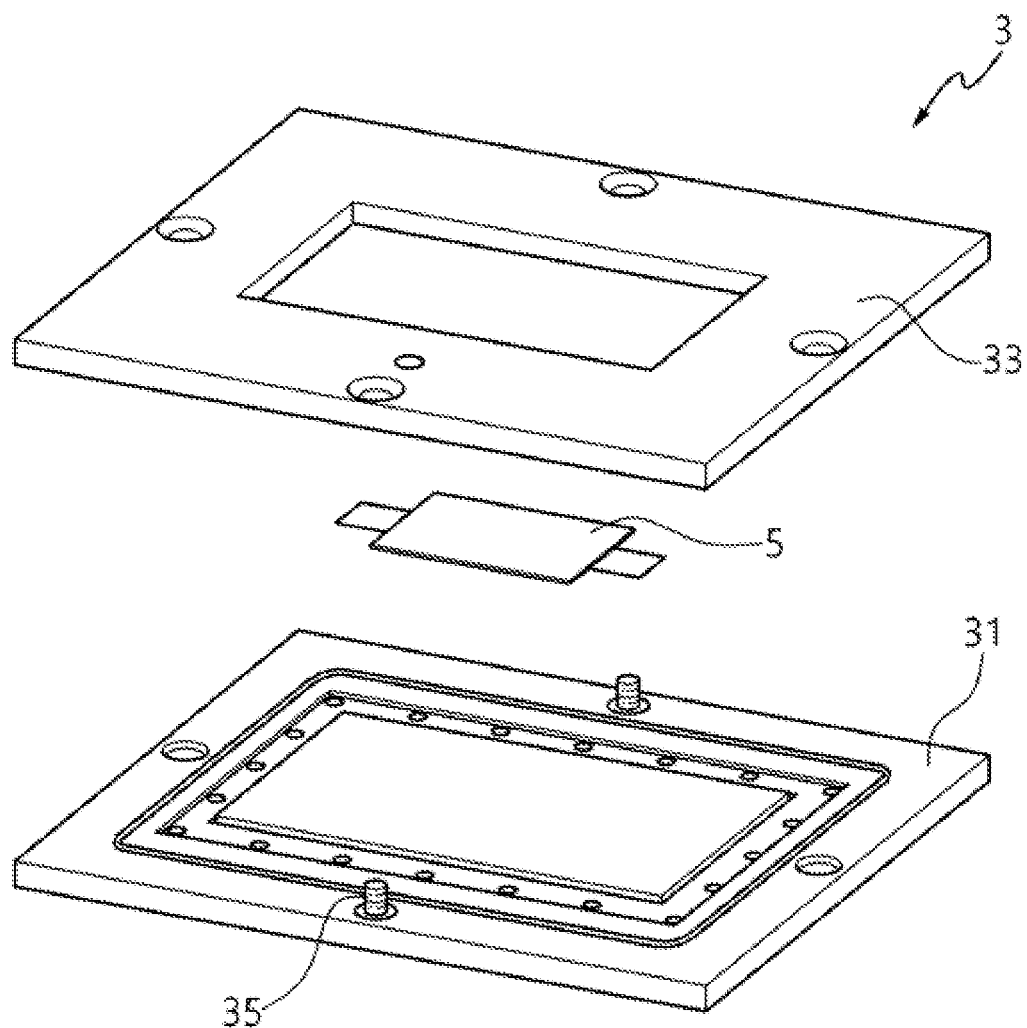
FIG. 1 is a reference view illustrating a vacuum sealing unit according to an embodiment of the present disclosure.

Hereinafter, exemplary embodiments of the present disclosure will be described in more detail with reference to the accompanying drawings. The embodiments of the present disclosure can be modified in various forms. Therefore, the scope of the present disclosure should not be construed as being limited to the following embodiments, but should be construed on the basis of the descriptions in the appended claims. The embodiments of the present disclosure are provided for complete disclosure of the present disclosure and to fully convey the scope of the present disclosure to those ordinarily skilled in the art.

As used herein, the singular forms are intended to include the plural forms as well, unless the context clearly indicates otherwise. It will be further understood that the terms "comprise" and/or "comprising", etc. when used in this specification, specify the presence of stated features, integers, steps, operations, elements, components, and/or combinations of them but do not preclude the presence or addition of one or more other features, integers, steps, operations, elements, components, and/or combinations thereof.

As used herein, when an element (or layer) is referred to as being disposed on another element (or layer), it can be disposed directly on the other element, or intervening element(s) (or layer(s)) may be disposed therebetween. In contrast, when an element is referred to as being directly disposed on or above another component, intervening element(s) are not located therebetween. Further, the terms "on", "above", "below", "upper", "lower", "one side", "side surface", etc. are used to describe one element's relationship to another element(s) illustrated in the drawings.

Hereinafter, a system 1 for pressurizing an all-solid-state secondary battery at high temperature according to an embodiment of the present disclosure will be described in detail with reference to the accompanying drawings.

FIG. 1 is a reference view illustrating a vacuum sealing unit 3 according to an embodiment of the present disclosure.

An automatic packing unit 50 hereinbelow means a system that during high-temperature pressurization of an all-solid-state secondary battery 4 using, for example, a warm isostatic press (WIP), automatically packs the secondary battery 5 in the vacuum sealing unit 3 and pressurizes them together. A detailed description thereof will be given later.

Referring to FIG. 1, the vacuum sealing unit 3 packs the all-solid-state secondary battery 5 composed of a unit cell or a bi-cell. The vacuum sealing unit 3 may include a base part 31 defining a lower part of the vacuum sealing unit 3 and a cover part 33 covering the secondary battery 5 by combining with the top of the base part 31. The base part 31 and the cover part 33 may be integrally formed such that one side of the base part 31 is connected to one side of the cover part 33 by a hinge or the like, or may be formed to be physically separated. However, the present disclosure is not limited thereto.

At least one side of each of the base part 31 and the cover part 33 may be made of a material having high elongation characteristics so as to pressurize the secondary battery 5 therein.

The vacuum sealing unit 3 may include a coupler 35 for engaging and disengaging the base part 31 and the cover part 33 to pack and unpack the secondary battery 5. The coupler 35 may be configured as a latch, a ball lock pin, or a clamp, or may be configured as any configuration such as various known coupling/fastening devices. However, the present disclosure is not limited thereto.

In addition, an air inlet and outlet port (not illustrated) may be formed on one side of the vacuum sealing unit 3 to form a vacuum in an inner space thereof in which the secondary battery 5 is accommodated.

Figure 2:
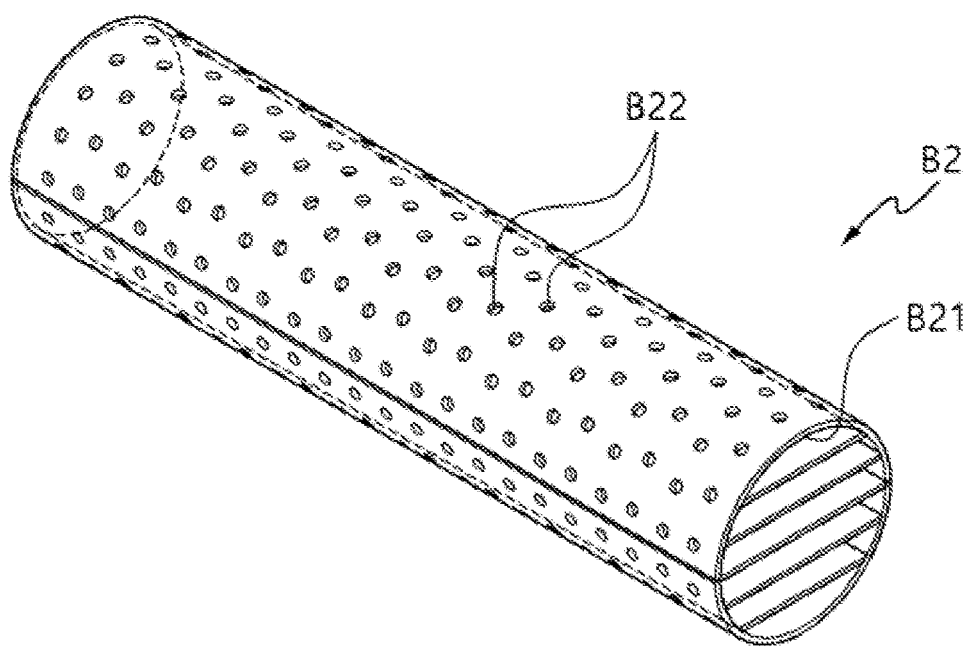
FIG. 2 is a perspective view illustrating a basket according to an embodiment of the present disclosure.

FIG. 2 is a perspective view illustrating a basket B2 according to an embodiment of the present disclosure.

Referring to FIG. 2, the basket B2 is accommodated or inserted into an inner space of an adjacent vessel by a second transfer unit 70 while accommodating the vacuum sealing unit 3 therein. The basket B2 has an outer surface having, for example, a substantially cylindrical shape. The basket B2 may include an opening B21 on one side thereof for allowing the vacuum sealing unit 3 to be inserted therethrough. The opening B21 may be formed on, for example, a front and/or rear surface of the basket B2.

In addition, it is preferable that a plurality of through-holes B22 are formed on the outer surface or outer circumferential surface of the basket B2 so that a fluid, which serves as a pressure transmitting medium to be described later, flows into the basket B2 through the through-holes B22 to pressurize the secondary battery 5 at high temperature.

Figure 3:
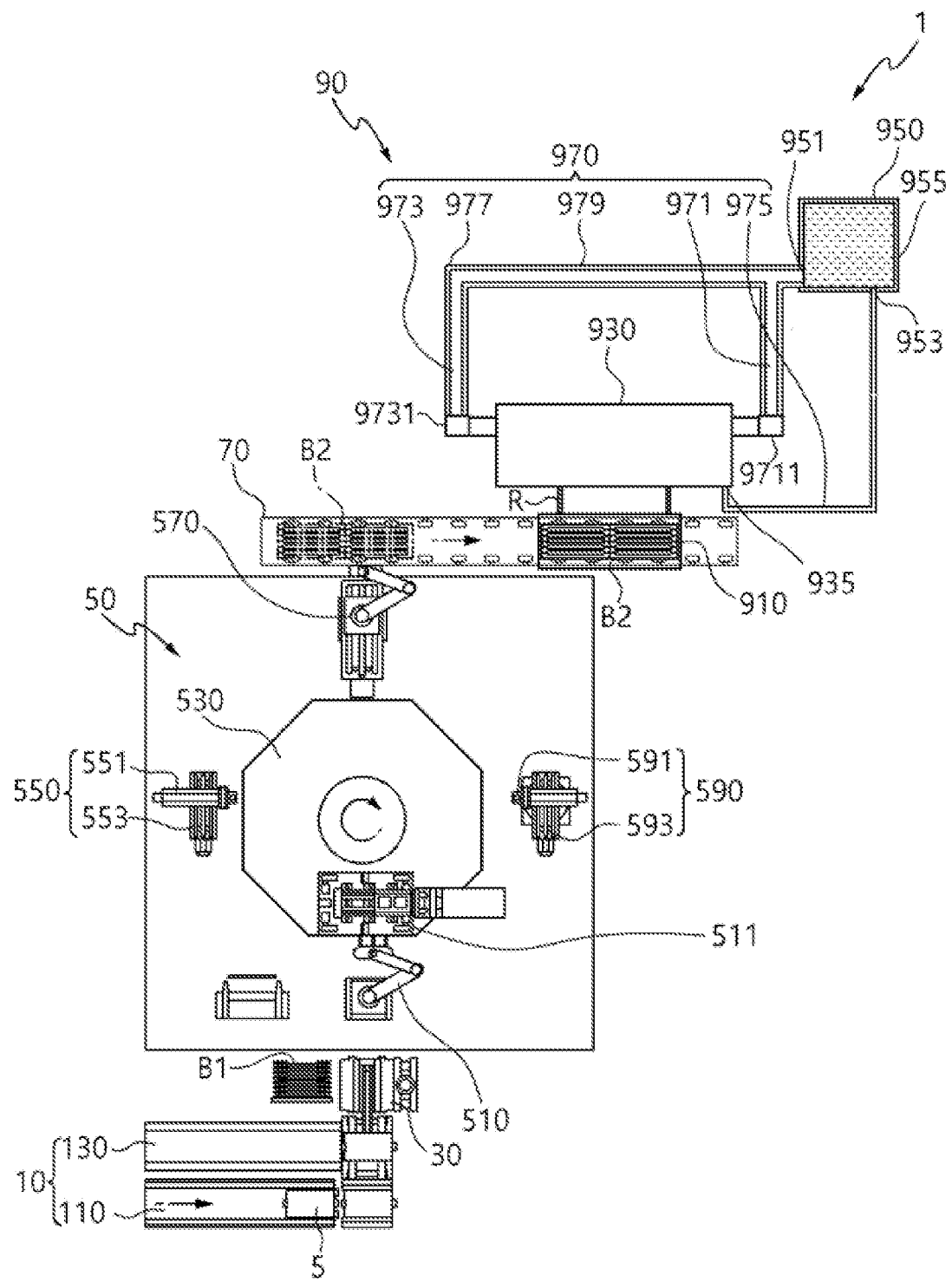
FIG. 3 is a conceptual view illustrating a system for pressurizing an all-solid-state secondary battery at high temperature according to an embodiment of the present disclosure.

FIG. 3 is a conceptual view illustrating a system 1 for pressurizing an all-solid-state secondary battery 5 at high temperature according to an embodiment of the present disclosure.

Referring to FIG. 3, the present disclosure relates generally to the system 1 for pressurizing the all-solid-state secondary battery 5 at high temperature. More particularly, the present disclosure relates to the system 1 for pressurizing the all-solid-state secondary battery 5 at high temperature, in which a pre-process of high-temperature pressurization for maximizing a contact interface between a solid electrolyte and an active material and minimizing interfacial resistance is automated in such a manner that the fed secondary battery 5 is automatically packed through a vacuum sealing unit 3 and then pressurized at high temperature, thereby shortening a tact time and thus increasing process efficiency.

To this end, the system 1 may include a first transfer unit 10, a feeding unit 30, an automatic packing unit 50, a second transfer unit 70, and a pressurizing unit 90.

The first transfer unit 10 transfers the secondary battery 5, and may be configured as, for example, a conveyor. For example, the first transfer unit 10 may be composed of a pair of a supply part 110 and a discharge part 130 that are disposed side by side with each other. The supply part 110 transfers the secondary battery 5 to be fed to the feeding unit 30. The discharge part 130 receives the secondary battery 5 discharged through the automatic packing unit 50 through the feeding unit 30 and discharges the secondary battery 5 from the system 1. The supply part 110 and the discharge part 130 may be disposed in parallel, and may transfer the secondary battery 5 in opposite directions. However, the present disclosure is not limited thereto.

The feeding unit 30 receives the secondary battery 5 fed from the first transfer unit 10 or feeds the secondary battery 5 discharged from the automatic packing unit 50 to the first transfer unit 10. The feeding unit 30 may be connected to, for example, one side of the first transfer unit 10 to transfer the fed secondary battery 5 in a direction different from the transfer direction of the first transfer unit 10. For example, the feeding unit 30 may transfer the secondary battery 5 in a direction of 90° relative to the transfer direction of the first transfer unit 10. In addition, it is preferable that an upper surface of the feeding unit 30 on which the secondary battery 5 is placed has substantially the same height as an upper surface of the first transfer unit 10 to prevent a step from occurring at the junction therebetween.

More specifically, the feeding unit 30 may be formed to be connected to the supply part 110 and take out the secondary battery 5 transferred on the supply part 110 to the outside of the first transfer unit 10. In addition, the feeding unit 30 may supply the secondary battery 5 discharged from the automatic packing unit 50 to the discharge part 130.

The secondary battery 5 supplied from the supply part 110 may be stacked on a buffer B1 through the feeding unit 30. In addition, the secondary battery 5 discharged from the automatic packing unit 50 may be stacked on the buffer B1, and then supplied to the discharge part 130 through the feeding unit 30. To this end, the feeding unit 30 may have a robot aim (not illustrated). Here, it is to be noted that the buffer B1 is configured as a buffer for preparing for the difference in operating time between the supply part 110 supplying the secondary battery 5 and the automatic packing unit 50, and is not an essential configuration of the present disclosure.

The automatic packing unit 50 automatically packs the secondary battery 5 supplied through the feeding unit 30 into an inner space of the vacuum sealing unit 3 or unpacks the secondary battery 5 pressurized through the pressurizing unit 90 from the inner space of the vacuum sealing unit 3. To this end, the automatic packing unit 50 may include a first supply device 510, a work table 530, a vacuum device 550, a second supply device 570, and a vacuum release device 590.

The first supply device 510 transfers the secondary battery 5 between the feeding unit 30 and the work table 530. For example, the first supply device 510 may transfer the secondary battery 5 supplied through the feeding unit 30 to the work table 530 or, on the contrary, may transfer the secondary battery 5 supplied through the work table 530 to the feeding unit 30. Alternatively, the first supply device 510 may supply the secondary battery 5 stacked on the buffer B1 to the work table 530 or, on the contrary, may stack the secondary battery 5 discharged from the work table 530 on the buffer B1. The first supply device 510 may be configured as, for example, a robot arm.

In addition, the first supply device 510 may include an assembly part 511 for packing or unpacking the vacuum sealing unit 3. That is, the assembly part 511 automatically assembles and/or disassembles the base part 31 and the cover part 33 of the vacuum sealing unit 3. For example, the first supply device 510 may transfer and place the vacuum sealing unit 3 on the assembly part 511, and the assembly part 511 may disassemble the vacuum sealing unit 3 to separate a base part 31 and a cover part 33 from each other. Thereafter, the first supply device 510 may place the secondary battery 5 on the base part 31, and the assembly part 511 may then be lowered and assemble the cover part 33 with the base part 31. Although not further described herein, an opposite process is also possible. The first supply device 510 and the assembly part 511 are disposed adjacent to a first position of the work table 530. It is to be understood that the "first position", and a "second position", a "third position", and a "fourth position" which will be described later mean positions on the work table 530 parallel to the ground and spaced apart from each other by a rotational angle of 90°.

The work table 530 is rotated to enable sequential processes (vacuum formation, transfer to the second transfer unit 70 or discharge from the second transfer unit 70, and vacuum release) to be performed on the vacuum sealing unit 3 placed on one side of the work table 530. The first supply device 510, the vacuum device 550, the second supply device 570, and the vacuum release device 590 may be parallel to the ground and spaced apart from each other by a rotational angle of 90° around the work table 530. Thus, as the work table 530 is rotated, the vacuum sealing unit 3 may be positioned adjacent to each of the configurations 510, 550, 570, and 590. To this end, one side, preferably a lower portion, of the work table 530, is preferably connected to an actuating means such as a rotary motor so that the work table 530 is rotated clockwise or counterclockwise.

The vacuum device 550 is disposed adjacent to the second position of the work table 530 and forms a vacuum in the inner space of the vacuum sealing unit 3. For example, the vacuum device 550 may include a first flow path forming part 551 communicating with the air inlet and outlet port to form a vacuum in the inner space of the vacuum sealing unit 3, and a first actuating means 553 for moving the first flow path forming part 551 forward and backward. It is to be understood that the term "moving forward" means movement in the direction of approaching the adjacent vacuum sealing unit 3, and "moving backward" means movement in an opposite direction.

The first flow path forming part 551 is moved forward by the first actuating means 553 to be connected or coupled to the air inlet and outlet port. A flow path (not illustrated) allowing flow of air from the inner space of the vacuum sealing unit 3 is formed inside the first flow path forming part 551. The inner space of the vacuum sealing unit 3 may be made vacuum by a vacuum pump and a conduit connected to one side of the first flow path forming part 551.

The first actuating means 553 moves the first flow path forming part 551 forward and backward. The first actuating means 553 may be configured as, but is not limited to, for example, a hydraulic cylinder or a pneumatic cylinder.

The second supply device 570 is disposed adjacent to the third position of the work table 530 and enables transfer of the vacuum sealing unit 3 between the work table 530 and the second transfer unit 70. The second supply device 570 may be configured as, for example, a robot arm. More specifically, the second supply device 570 may insert the vacuum sealing unit 3 on the work table 530 into a basket B2 on the second transfer unit 70 or, on the contrary, may place the vacuum sealing unit 3 in the basket B2 on the work table 530.

The vacuum release device 590 is disposed adjacent to the fourth position of the work table 530 and releases a vacuum in the inner space of the vacuum sealing unit 3. The vacuum release device 590 may have substantially the same configuration as the vacuum device 550. That is, the vacuum release device 590 may include a second flow path forming part 591 and a second actuating means 593 corresponding to the first flow path forming part 551 and the first actuating means 553.

The second transfer unit 70 transfers the basket B2 in which the vacuum sealing unit 3 is accommodated in a direction approaching one side of a pressurizing chamber part 930 or transfers the basket B2 in an opposite direction. The second transfer unit 70 may be configured as, but is not limited to, for example, a conveyor.

The pressurizing unit 90 supplies a fluid (e.g., liquid) serving as a pressure transmitting medium to the basket B2 in which the vacuum sealing unit 3 is accommodated so that the secondary battery 5 is pressurized at high temperature.

To this end, the pressurizing unit 90 may include a vessel 910, the pressurizing chamber part 930, a storage tank 950, and a pipe part 970.

The vessel 910 is moved laterally into an inner space of the pressurizing chamber part 930 or is moved laterally in an opposite direction. The vessel 910 has a through-hole formed through front and rear sides thereof so that the basket B2 in which the secondary battery 5 or the vacuum sealing unit 3 is disposed is inserted along the through-hole. It is preferable that the vessel 910 is connected to the inner space of the pressurizing chamber part 930 by, for example, a rail R configuration, so that the vessel 910 is moved laterally on the rail R. Alternatively, the rail R may be replaced by an arbitrary configuration that guides lateral movement of the vessel 910, such as a connecting rod. Thus, each vessel 910 may be in a standby position to be connected to the corresponding second transfer unit 70, or may be laterally moved to a position in the inner space of the pressurizing chamber part 930. The vessel 910 located in the pressurizing chamber part 930 may separate the internal environment of the pressurizing chamber part 930 from the outside by using a transfer section shutter.

In addition, an inlet 911 may be formed on the front side of the vessel 910 and an outlet 913 may be formed on the rear side of the vessel 910. For example, as the second transfer unit 70 is driven, the basket B2 may be inserted into an inner space of the vessel 910 located in the standby position through the inlet 911 of the vessel 910. After that, the vessel 910 may be inserted into the inner space of the pressurizing chamber part 930 on the rail R so that the secondary battery 5 is subjected to a high-temperature pressurization process.

When the process is completed, the vessel 910 may be laterally moved again to the outside of the pressurizing chamber part 930 and returned back to the standby position, and then the basket B2 in the vessel 910 may be discharged from the outlet 913 and transferred again to the automatic packing unit 50 along the second transfer unit 70. The inlet 911 and the outlet 913 communicate with each other through the through-hole of the vessel 910. It is preferable that the through-hole is formed to have a vertical cross-sectional shape conforming to that of the basket B2. In addition, each of the inlet 911 and the outlet 913 may have a cross-sectional area substantially the same as or slightly larger than that of the vessel 910. As another example, the inlet 911 may function as an outlet, but is not limited thereto.

A temperature sensor (not illustrated) may be disposed on one side of the vessel 910. The temperature sensor (not illustrated) may adjust the internal environmental temperature of the vessel 910 when heat is transferred through a first heating block 931, which will be described later.

Figure 4:
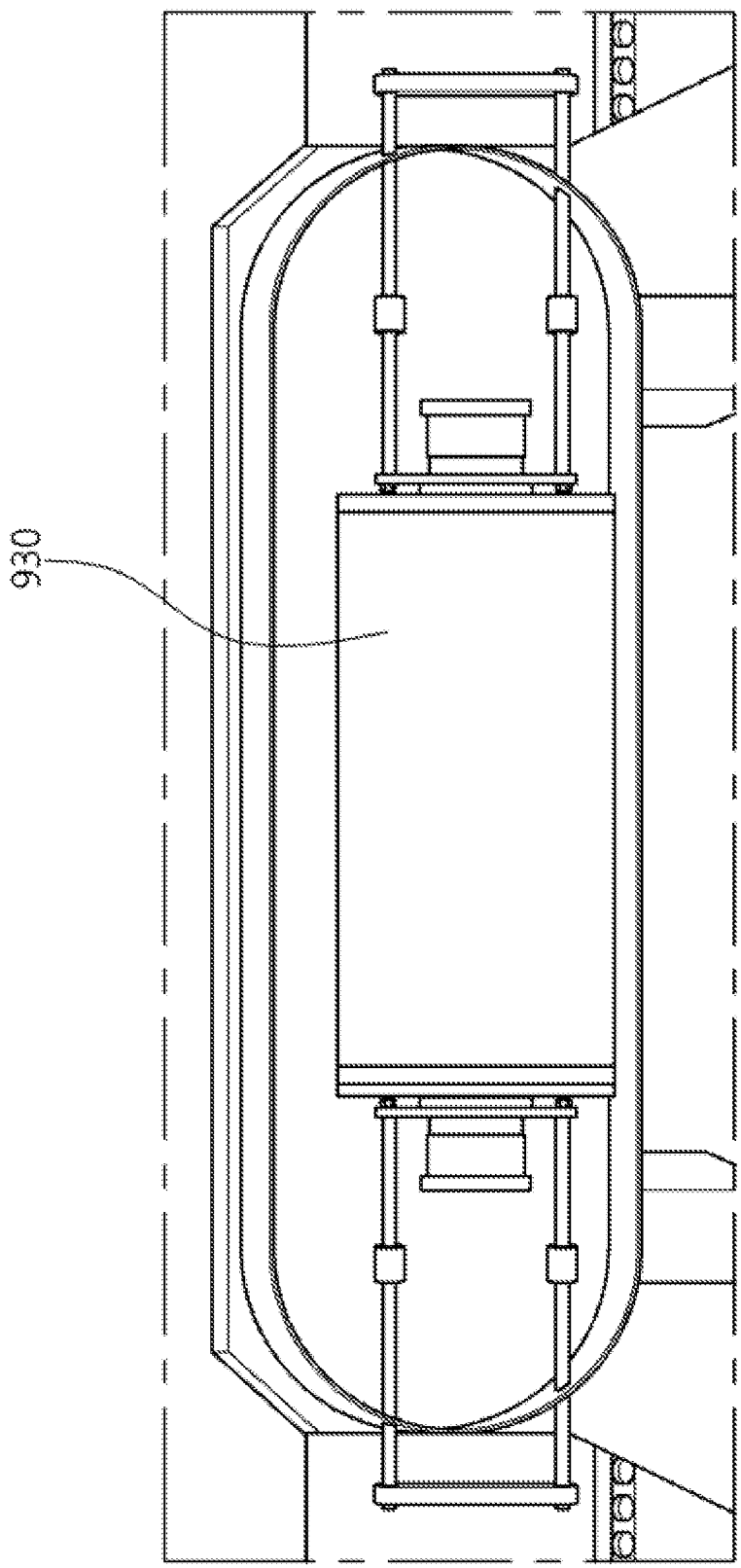
FIG. 4 is a schematic reference view illustrating a pressurizing chamber part illustrated in FIG. 3.
Figure 5:
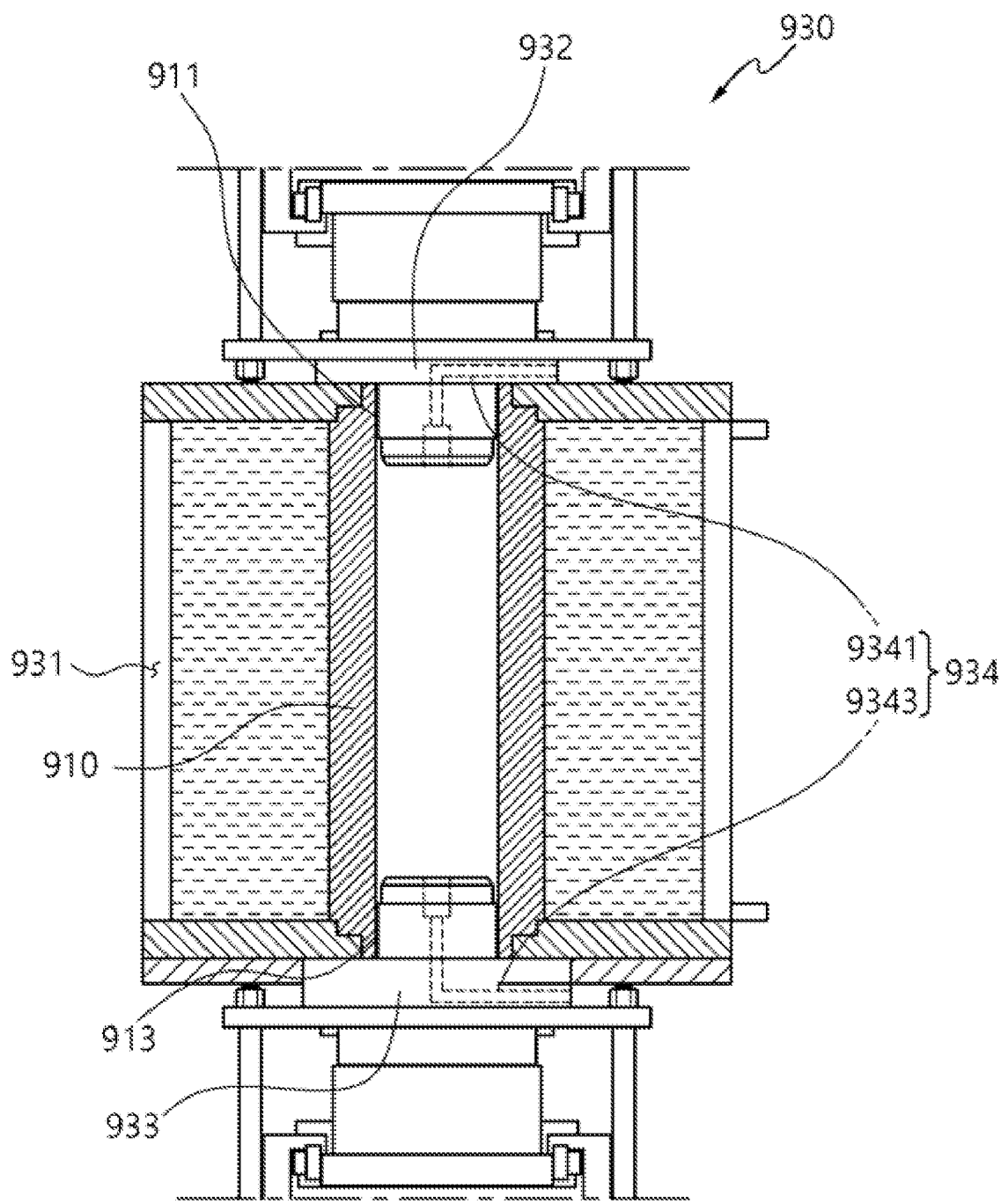
FIG. 5 is a horizontal sectional view illustrating the pressurizing chamber part illustrated in FIG. 3.

FIG. 4 is a schematic reference view illustrating the pressurizing chamber part 930 illustrated in FIG. 3; and FIG. 5 is a horizontal sectional view illustrating the pressurizing chamber part 930 illustrated in FIG. 3.

Referring to FIGS. 3 to 5, the pressurizing chamber part 930 pressurizes the secondary battery 5 accommodated in the vessel 910 inserted into the inner space thereof at high temperature using the supplied fluid (e.g., liquid) serving as a pressure transmitting medium in a state in which the inlet 911 and/or the outlet 913 of the vessel 910 are covered.

As described above, the inner space of the pressurizing chamber part 930 is connected to the rail R to allow the vessel 910 to be inserted and discharged therethrough. Thus, the inner space of the pressurizing chamber part 930 may be formed to have a size suitable for inserting the vessel 910 therein. In addition, the pressurizing chamber part 930 may have an open side into which the vessel 910 is inserted.

To this end, the pressurizing chamber part 930 may include a first heating block 931, a first cover 932, a second cover 933, a fluid flow hole 934, and a residual fluid discharge hole 935.

The first heating block 931 is installed on one side of the pressurizing chamber part 930 or in the inner space thereof and transfers high-temperature heat to the fluid (e.g., liquid) serving as a pressure transmitting medium. The first heating block 931 may be formed, for example, in a shape surrounding an outer circumferential surface of the inserted vessel 910 so that heat is transferred to the inside of the vessel 910 as the fluid flows through the inside of the first heating block 931. However, the present disclosure is not limited thereto, and any known or not yet known configuration capable of transferring thermal energy to the fluid supplied to the inside of the pressurizing chamber part 930 may be used. In the case of the above example, a separate supply device (not illustrated) for supplying the fluid to the inside of the first heating block 931 may be connected to one side of the first heating block 931. Although the first heating block 931 has been described as being formed on one side of the pressurizing chamber part 930, the present disclosure is not limited thereto, and it may be formed on one side of the pressurizing unit 90, such as the vessel 910.

The first cover 932 opens and closes the inlet 911 of the inserted vessel 910, and may be designed to be reciprocated forward and backward by a predetermined distance. For example, the first cover 932 may be connected to and reciprocated by an actuating means such as, but is not limited to, a hydraulic cylinder (not illustrated). In addition, a side of the first cover 932 inserted into the inlet 911 may be formed to have a cross-sectional shape complementary to that of the inlet 911.

The second cover 933 opens and closes the outlet 913 of the inserted vessel 910, and may be designed to be reciprocated forward and backward by a predetermined distance. The second cover 933 may be formed in substantially the same shape as the first cover 932 and may be reciprocated in the same manner as the first cover 932. Thus, a detailed description thereof is omitted.

The fluid flow hole 934 is a through-hole serving as a path for flow of the fluid serving as a pressure transmitting medium. The fluid flow hole 934 may be formed on one side of the pressurizing chamber part 930. The fluid flow hole 934 may include a first through-hole 9341 allowing the fluid to be supplied into and/or discharged from the inner space of the pressurizing chamber part 930, and a second through-hole 9343 allowing the fluid to be supplied into and/or discharged from the inner space of the pressurizing chamber part 930 after the high-temperature pressurization process is completed. Although not particularly limited, it is preferable that the first through-hole 9341 is formed on one of the first cover 932 and the second cover 933 and the second through-hole 9343 is on the remaining one of the first cover 932 and the second cover 933. The first through-hole 9341 may be connected to a first pipe 971 which will be described later, and the second through-hole 9343 may be connected to a second pipe 973.

Referring to FIG. 3, a residual fluid discharge hole 935 is a through-hole formed in the inner space of the pressurizing chamber part 930. The residual fluid discharge hole 935 allows the fluid, which remains in the inner space of the pressurizing chamber part 930 after exiting through the first through-hole 9341 and/or the second through-hole 9343 after the high-temperature pressurization process for the vessel 910 is completed, to be discharged to the outside of the pressurizing chamber part 930. To this end, it is preferable that the residual fluid discharge-hole 935 is formed at the bottom of the inner space of the pressurizing chamber part 930 so that the residual fluid is naturally discharged to the outside. The residual fluid discharge hole 935 may be connected to a residual discharge pipe 975 which will be described later.

Referring to FIG. 3, the storage tank 950 supplies the fluid to the inner space of the pressurizing chamber part 930 in a state in which the fluid serving as a pressure transmitting medium is stored. An inner space of the storage tank 950 in which the fluid is stored may communicate with the first pipe 971, the second pipe 973, and the residue discharge pipe 975. Thus, during the pressurization process, the storage tank 950 supplies the fluid to the pressurizing chamber part 930 through the first pipe 971 and/or the second pipe 973 in a state in which the fluid is stored, and after the pressurization process, the storage tank 950 receives the fluid in the pressurizing chamber part 930 again through the first pipe 971 and/or the second pipe 973. When the vessel 910 that has undergone the pressurization process is discharged from the pressurizing chamber part 930, the fluid remaining in the inner space of the pressurizing chamber part 930 is supplied to the storage tank 950 through the residue discharge pipe 975.

The fluid stored in the storage tank 950 is preferably a liquid, and may include, but is not limited to, for example, water or any one or more of various heat transfer oils known or not yet known. In general, since thermal oil has a relatively higher operating temperature than water, it is preferable to use the thermal oil, which is advantageous in terms of high temperature and high pressure. In addition, a first communication hole 951 in communication with the first pipe 971 and the second pipe 973, and a second communication hole 953 in communication with the residue discharge pipe 975 may be formed at different positions on the storage tank 950.

In addition, the storage tank 950 preferably has a second heating block 955 on one side thereof to transfer high-temperature heat to the fluid. In the case of a solid electrolyte of the all-solid-state secondary battery 5, since the movement of ions is confined within a solid lattice, the interface resistance has to be minimized while maximizing the contact interface between the active materials and the electrolyte, and thus a high-temperature/high-pressure pressurization process is required. To this end, the storage tank 950 preferably includes a second heating block 955 so that the fluid is supplied in a high-temperature state to the pressurizing chamber part 930. The second heating block 955 may have substantially the same structure as the first heating block 931, and thus a detailed description thereof is omitted.

The pipe part 970 has a first end connected to the storage tank 950 and a second end connected to the pressurizing chamber part 930, and provides a fluid supply and/or discharge path between the two configurations. To this end, the pipe part 970 may include the first pipe 971, the second pipe 973, the residue discharge pipe 975, a heating jacket 977, and a common pipe 979.

The first pipe 971 is a pipe having a first end in communication with the first communication hole 951 and a second end in communication with a first side of the pressurizing chamber part 930. The first pipe 971 provides a flow path allowing the fluid stored in the storage tank 950 to be supplied to the inner space of the pressurizing chamber part 930 or to flow in an opposite direction. A pre-fill pump 9711 for supplying the fluid into or discharging the fluid from the inner space of the pressurizing chamber part 930 may be formed on one side of the first pipe 971. The first pipe 971 may be branched from the common pipe 979 with the second pipe 973. The common pipe 979 is connected to the first communication hole 951.

The second pipe 973 is a pipe having a first end in communication with the first communication hole 951 and a second end in communication with a second side of the pressurizing chamber part 930. The second pipe 973 provides a flow path allowing the fluid supplied to the inner space of the pressurizing chamber part 930 to be re-supplied to the storage tank 950 or to flow in an opposite direction. An intensifier pump 9731 may be formed on one side of the second pipe 973. When the supply of fluid to the inner space of the pressurizing chamber part 930 is completed through the first pipe 971 and the second pipe 973, the pressure in the inner space of the pressurizing chamber part 930 may be increased through the intensifier pump 9731. The second pipe 973 may be branched from the common pipe 979. The common pipe 979 is connected to the first communication hole 951.

The heating jacket 977 may be formed on outer surfaces of the first pipe 971 and/or the second pipe 973 to minimize heat loss to the flowing fluid. The heating jacket 977 may be formed on the common pipe 979 and additionally on the first and/or second pipes 971 and 973, but the present disclosure is not limited thereto. The heating jacket 977 may be, but is not limited to, any known or not yet known corresponding configuration formed on an outer surface of a pipe.

The residue discharge pipe 975 is a pipe having a first end connected to the second communication hole 953 and a second end connected to the residual fluid discharge hole 935. The residue discharge pipe 975 provides a flow path allowing the fluid remaining in the pressurizing chamber part 930 to flow toward the storage tank 950 after the high-temperature pressurization process is completed.

Figure 6:
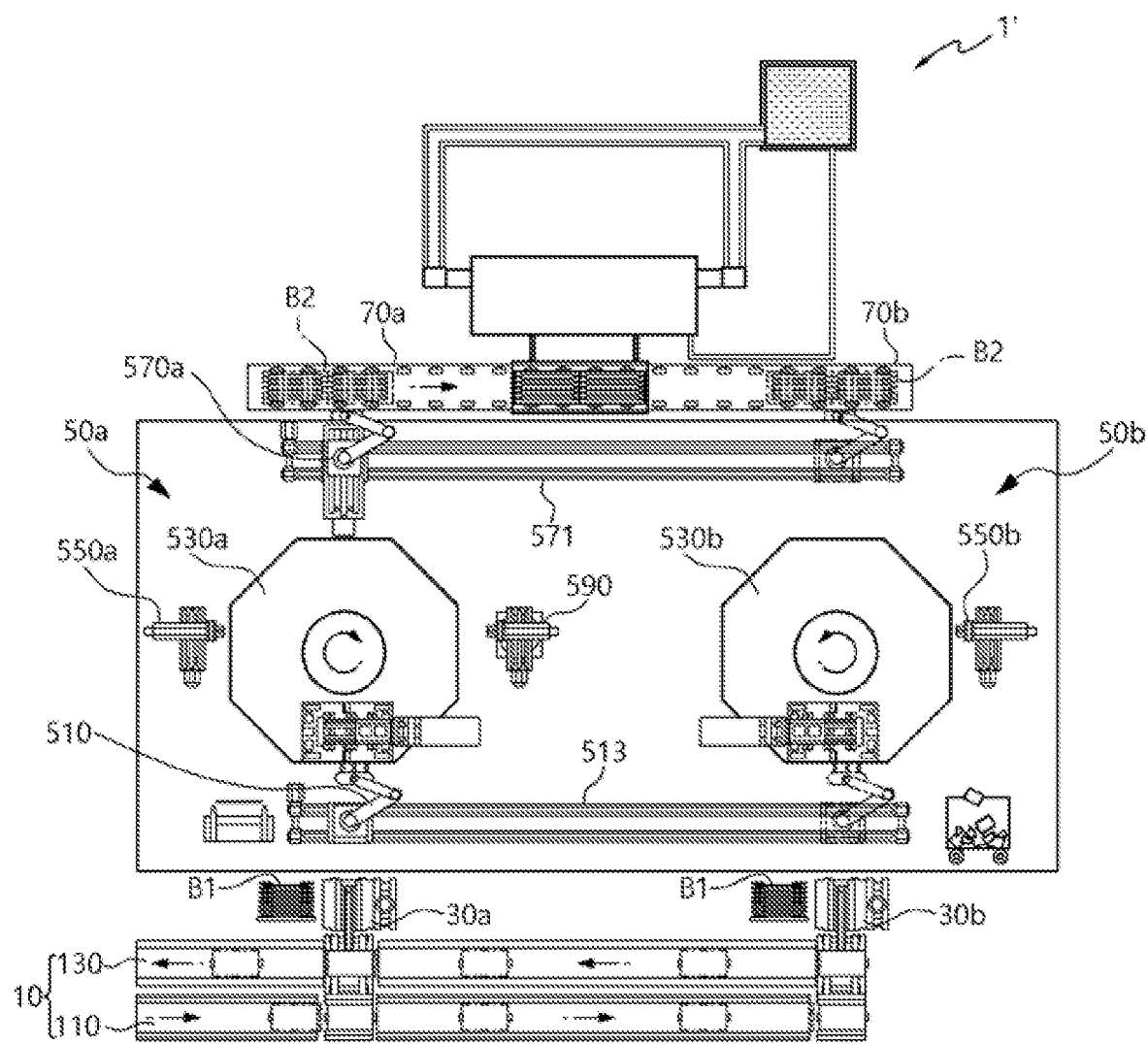
FIG. 6 is a conceptual view illustrating a system for pressurizing an all-solid-state secondary battery at high temperature according to another embodiment of the present disclosure.

FIG. 6 is a conceptual view illustrating a system 1 for pressurizing an all-solid-state secondary battery 5 at high temperature according to another embodiment of the present disclosure.

Referring to FIG. 6, the system 1 according to the present embodiment is different from the system 1 described above in that a feeding unit 30, an automatic packing unit 50, and a second transfer unit 70 are each provided in a pair.

For example, a pair of feeding units 30a and 30b spaced apart from each other are disposed along a transfer direction of a first transfer unit 10. Each of the feeding units 30a and 30b may be disposed adjacent to a pair of automatic packing units 50a and 50b, respectively. In addition, work tables 530a and 530b and vacuum devices 550a and 550b may be disposed in the automatic packing units 50a and 50b, respectively. The first supply device 510 may be disposed in each of the automatic packing units 50a and 50b. Alternatively, one first supply device 510 may be disposed between the automatic packing units 50a and 50b to be linearly reciprocated by a movement guide device 513 and an actuating means. However, the present disclosure is not limited thereto. In addition, a second supply device 570 may have substantially the same configuration as the first supply device 510. Movement guide devices 513 and 571 may be, but are not limited to, for example, rails.

In addition, the automatic packing units 50a and 50b may rotate respective fed all-solid-state secondary batteries 5 in opposite directions. That is, when one of the secondary batteries 5 is rotated clockwise on the work table 530a of the automatic packing unit 50a, the remaining one of the secondary batteries 5 may be rotated counterclockwise on the work table 530b of the automatic packing unit 50b. Thus, the automatic packing units 50a and 50b may be disposed symmetrically with each other. A vacuum release device 590 may be formed in each of the automatic packing units 50a and 50b. Alternatively, the automatic packing units 50a and 50b may share one vacuum release device 590.

In addition, a pair of second transfer units 70a and 70b may be provided to correspond to the automatic packing units 50a and 50b, respectively. The second transfer units 70a and 70b may be formed, for example, on opposite sides of a pressurizing chamber part 930, respectively. A basket B2 may be disposed on each of the second transfer units 70.

With this configuration, when the secondary battery 5 having been subjected to a high-temperature pressurization process is discharged to the second transfer unit 70a and the corresponding automatic packing unit 50a from the pressurizing chamber part 930, the second transfer unit 70b and the corresponding automatic packing unit 50b may pack and insert the secondary battery 5 to be subjected to the high-temperature pressurization process into a vessel 910. Thus, process efficiency may be increased.

FIGS. 7 to 20 are reference views illustrating a method of pressurizing an all-solid-state secondary battery 5 at high temperature according to an embodiment of the present disclosure.

Hereinafter, the method of pressurizing the all-solid-state secondary battery 5 according to the embodiment of the present disclosure will be described in detail with reference to the accompanying drawings.

Figure 7:
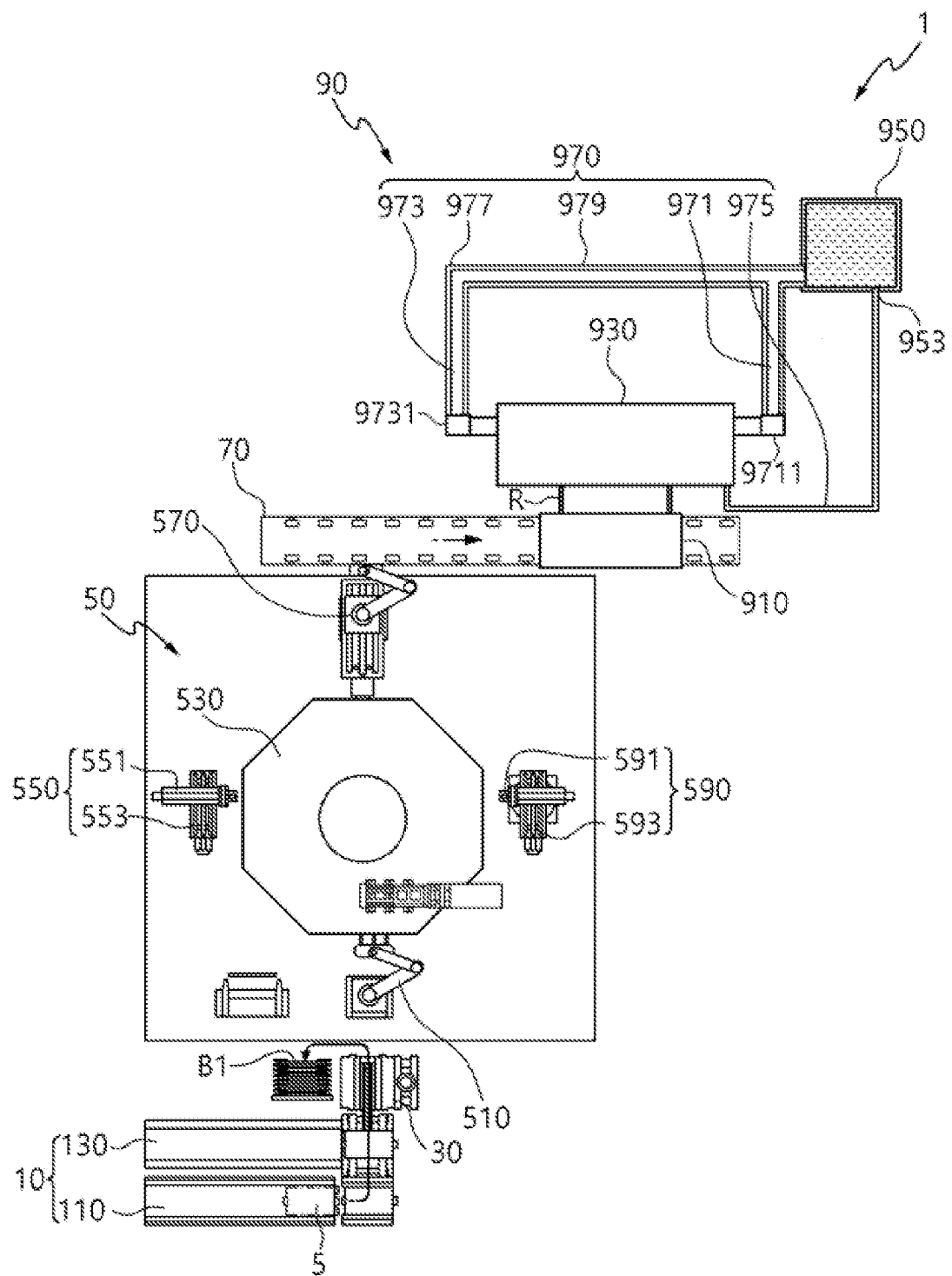
FIGS. 7 to 20 are reference views illustrating a method of pressurizing an all-solid-state secondary battery at high temperature according to an embodiment of the present disclosure.

First, referring to FIG. 7, the secondary battery 5 composed of a unit cell or a bi-cell is transferred from a supply part 110 to a feeding unit 30. After that, the feeding unit 30 feeds the fed secondary battery 5 to an automatic packing pat 50. At this time, the feeding unit 30 including, for example, a robot arm may stack the secondary battery 5 fed from the supply part 110 on a buffer B1.

Figure 8:
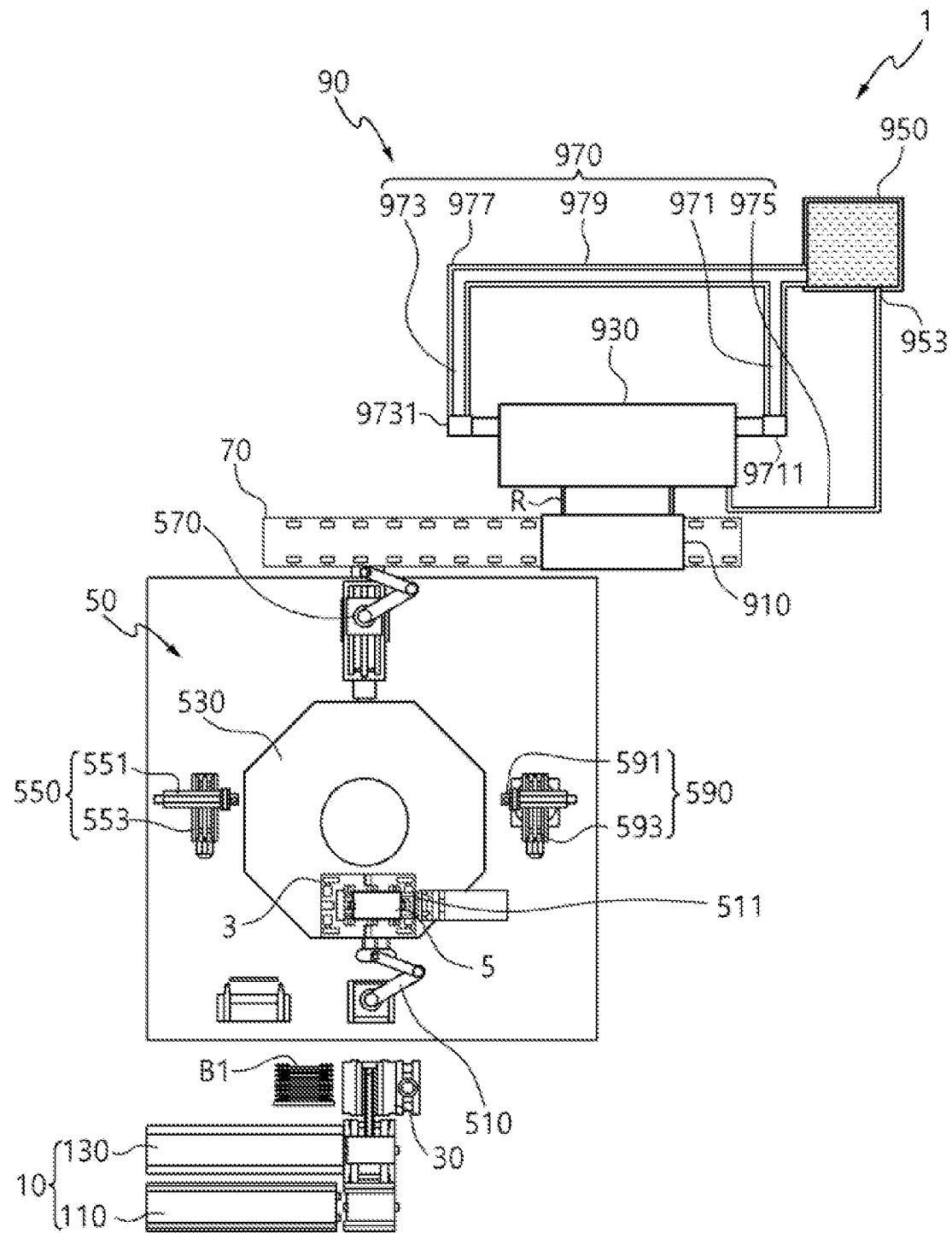

Then, referring to FIG. 8, a first supply device 510 of the automatic packing unit 50 transfers the secondary battery 5 stacked on the buffer B1 from the feeding unit 30 to a work table 530. Illustratively describing this process, the first supply device 510 and an assembly part 511 sequentially place a base part 31, the secondary battery 5, and a cover part 33 on a first position of the work table 530, and then couple or fasten the base part 31 and the cover part 33 to each other. As a result, a vacuum sealing unit 3 is hermetically sealed.

Figure 9:
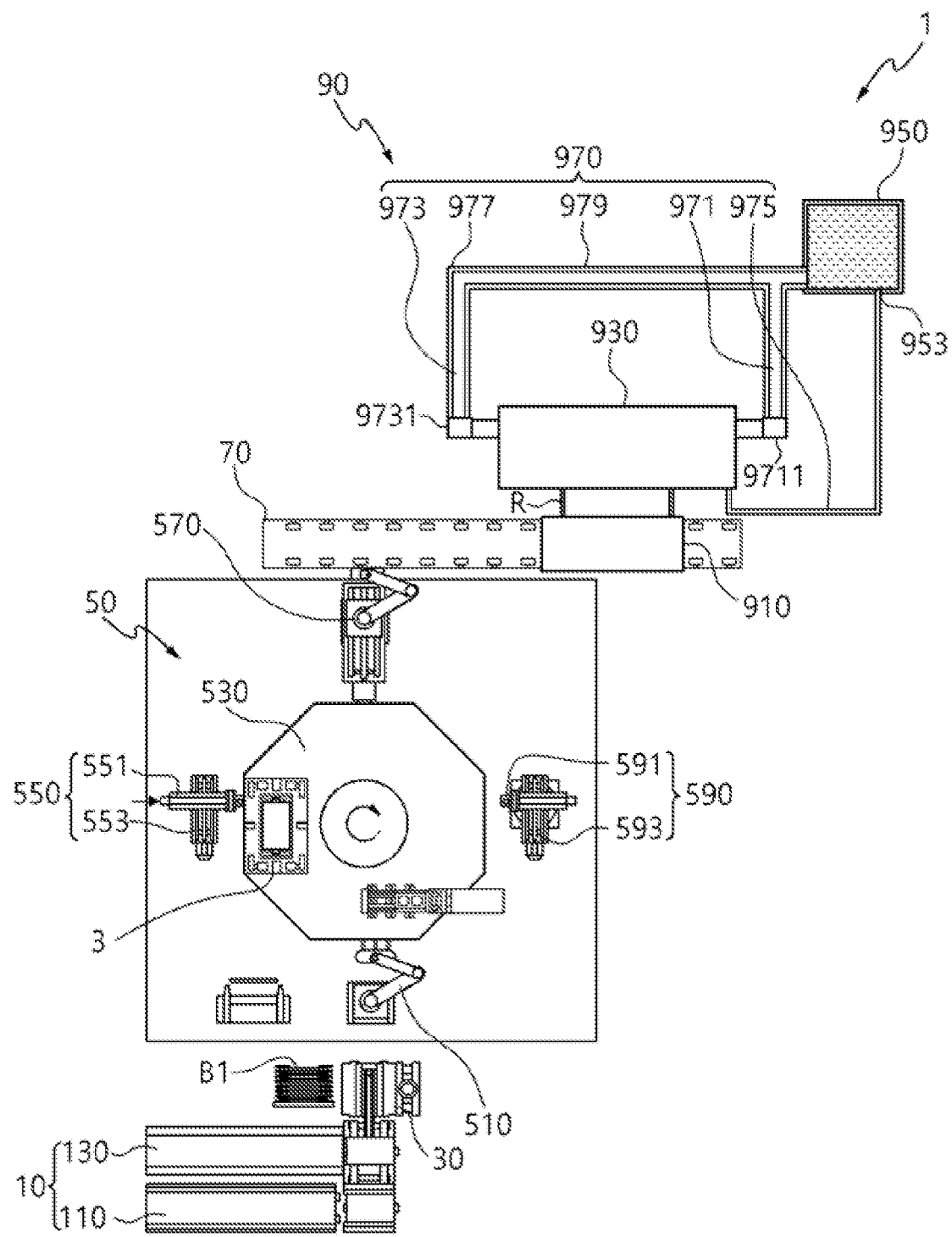

Then, referring to FIG. 9, the work table 530 is rotated until the vacuum sealing unit 3 reaches a second position adjacent to a vacuum device 550. After that, a first flow path forming part 551 of the vacuum device 550 is moved forward by a first actuating means 553 so that an inlet thereof communicates with an air inlet and outlet port of the vacuum sealing unit 3. Then, a vacuum is formed in an inner space of the vacuum sealing unit 3.

Figure 10:
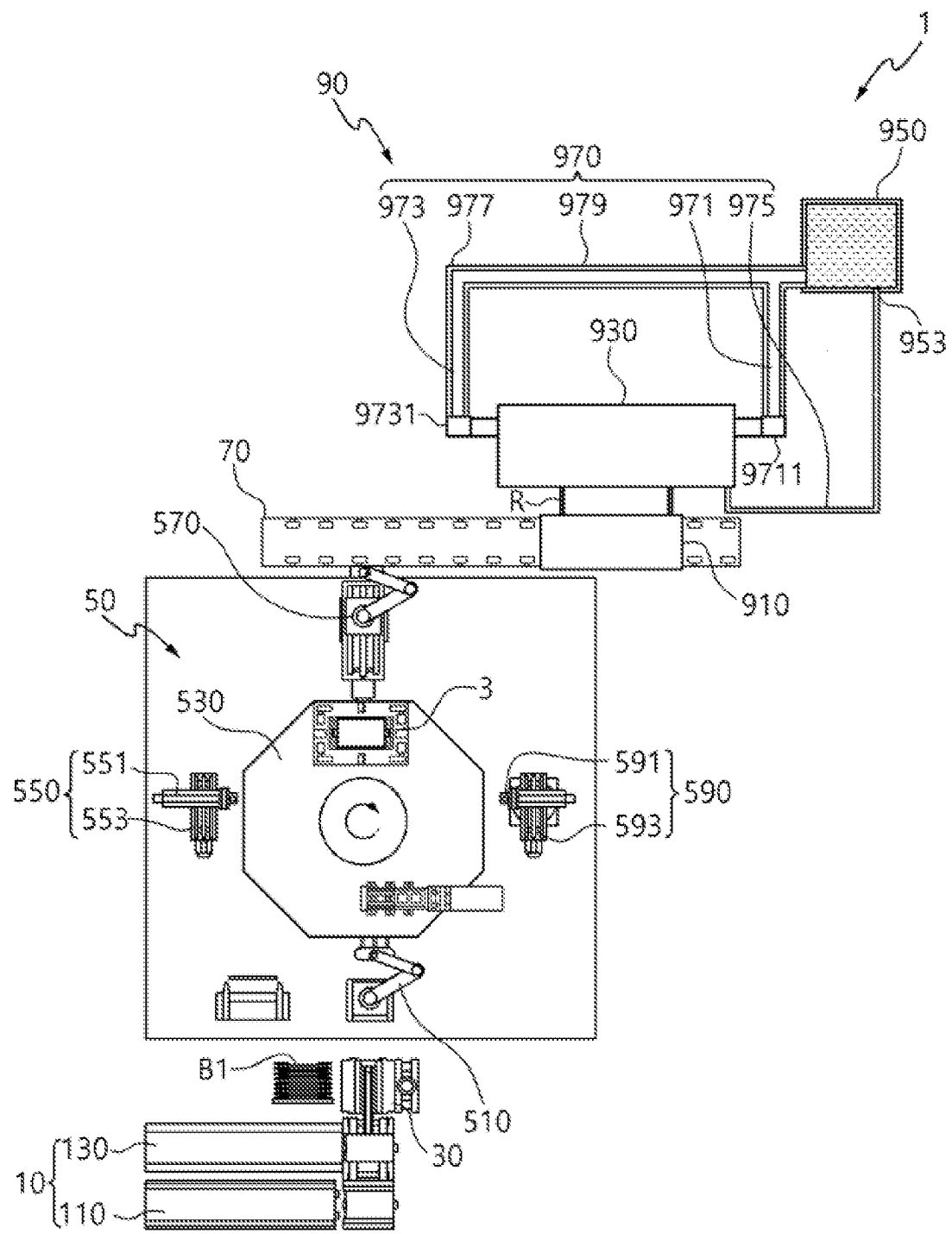
Figure 11:
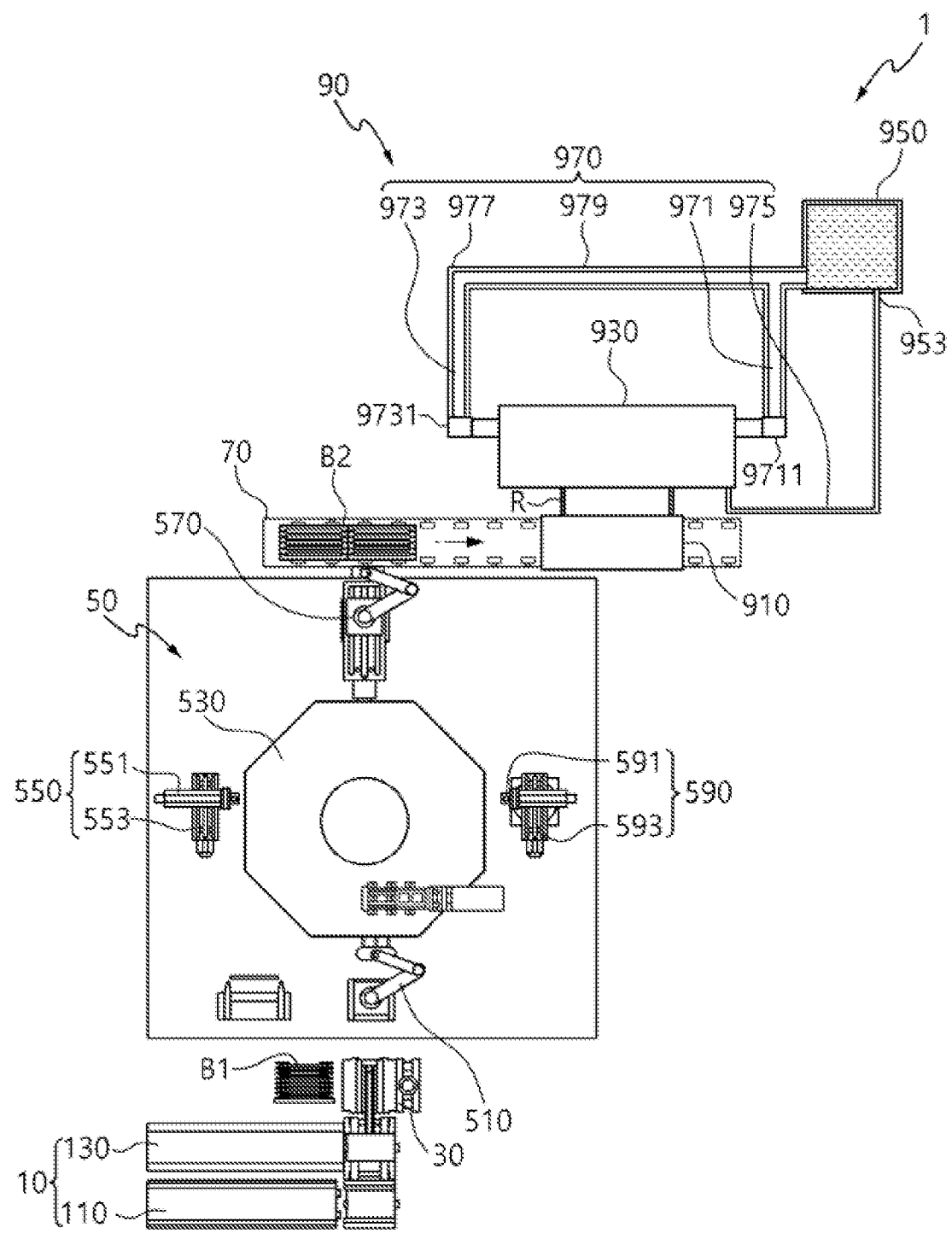

Then, referring to FIG. 10, the work table 530 is rotated until the vacuum sealing unit 3 under vacuum reaches a third position. Then, referring to FIG. 11, a second supply device 570 inserts the vacuum sealing unit 3 in the third position into a basket B2 through a second transfer unit 70.

Figure 12:
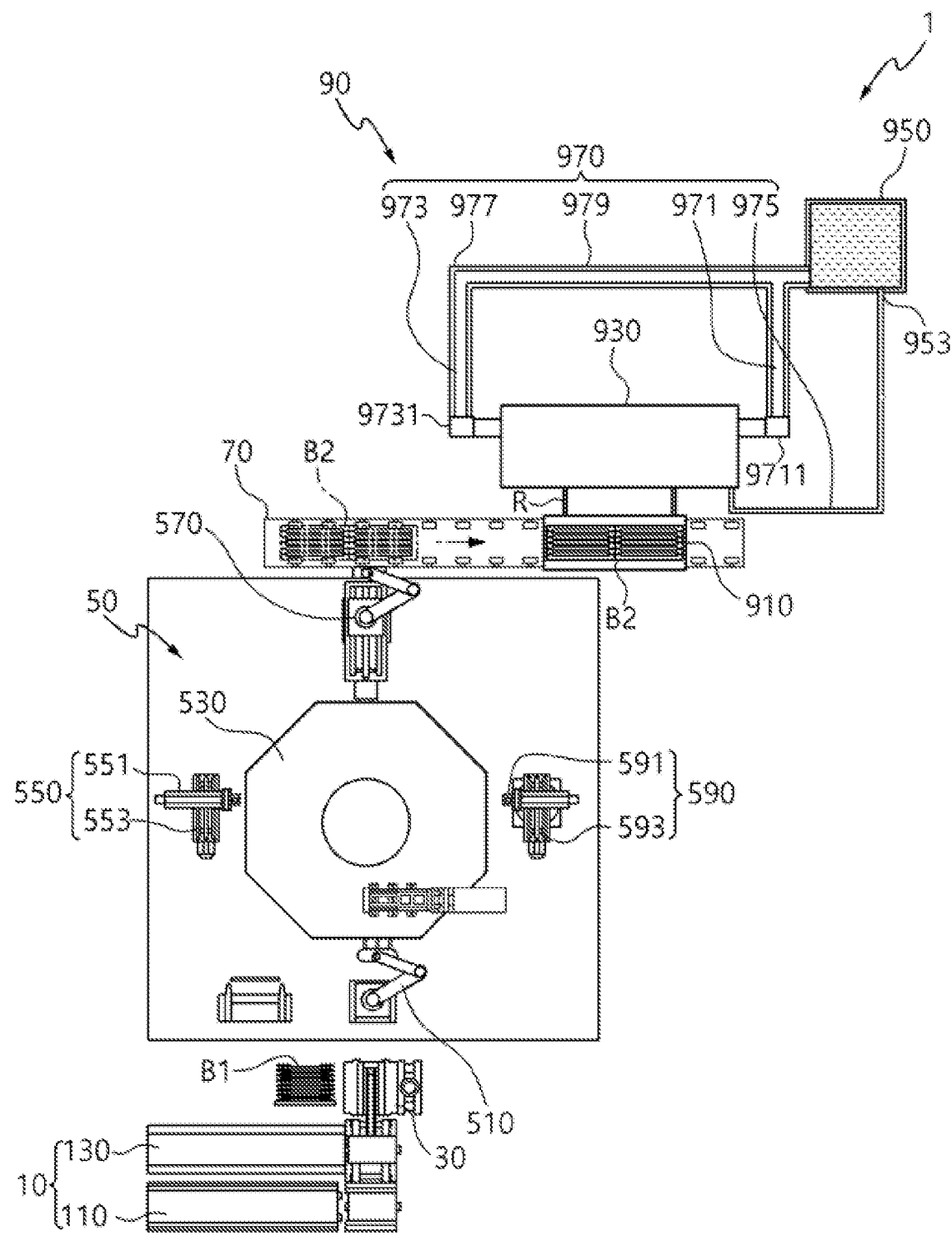

Then, referring to FIG. 12, the basket B2 is transferred into a vessel 910. At this time, the transfer of the basket B2 may be performed through the second transfer unit 70.

Figure 13:
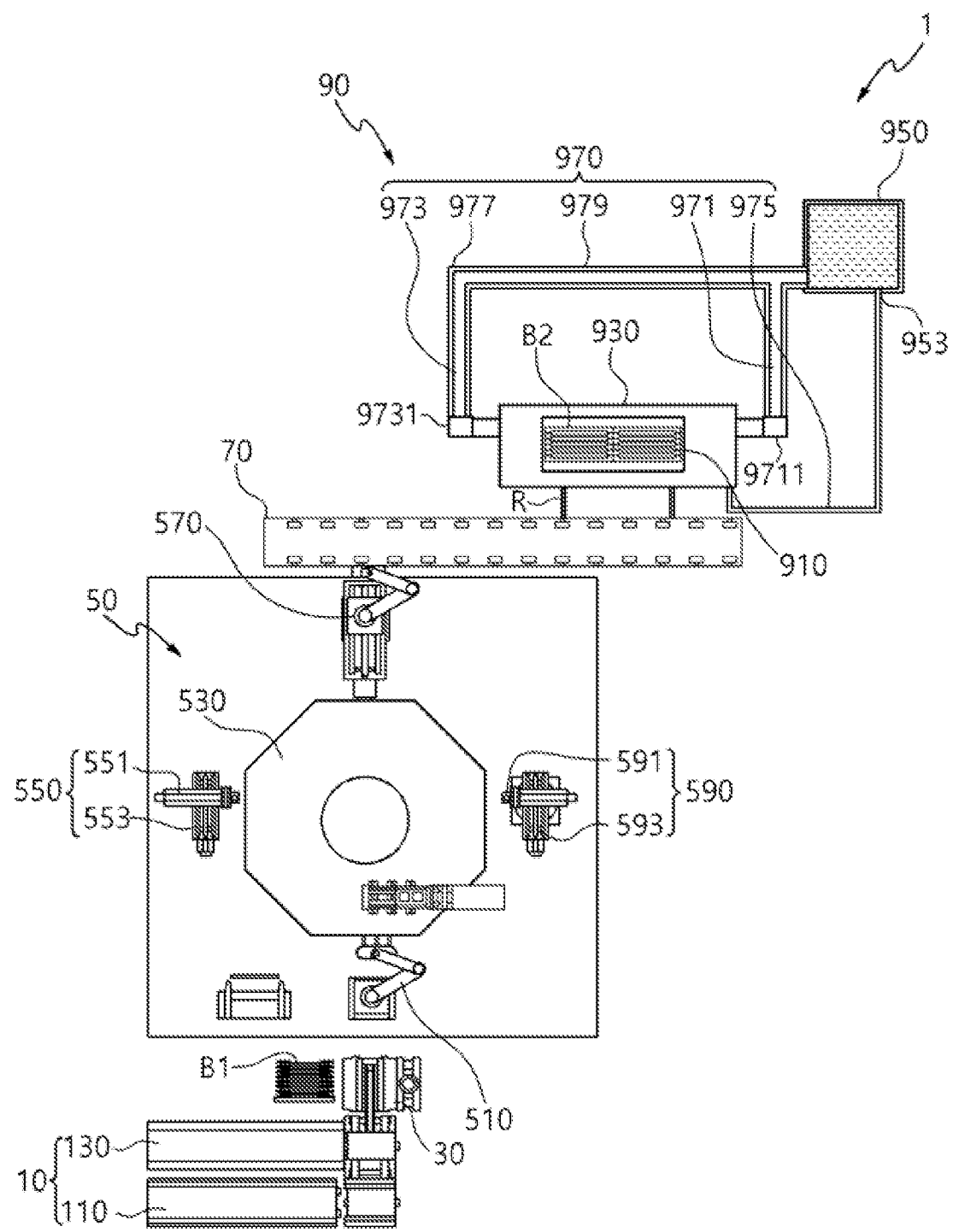

Then, referring to FIG. 13, the vessel 910 is moved laterally into an inner space of a pressurizing chamber part 930 through a connection structure such as a rail R. After that, a first cover 932 closes an inlet 911 of the vessel 910 and a second cover 933 closes an outlet 913 of the vessel 910.

Figure 14:
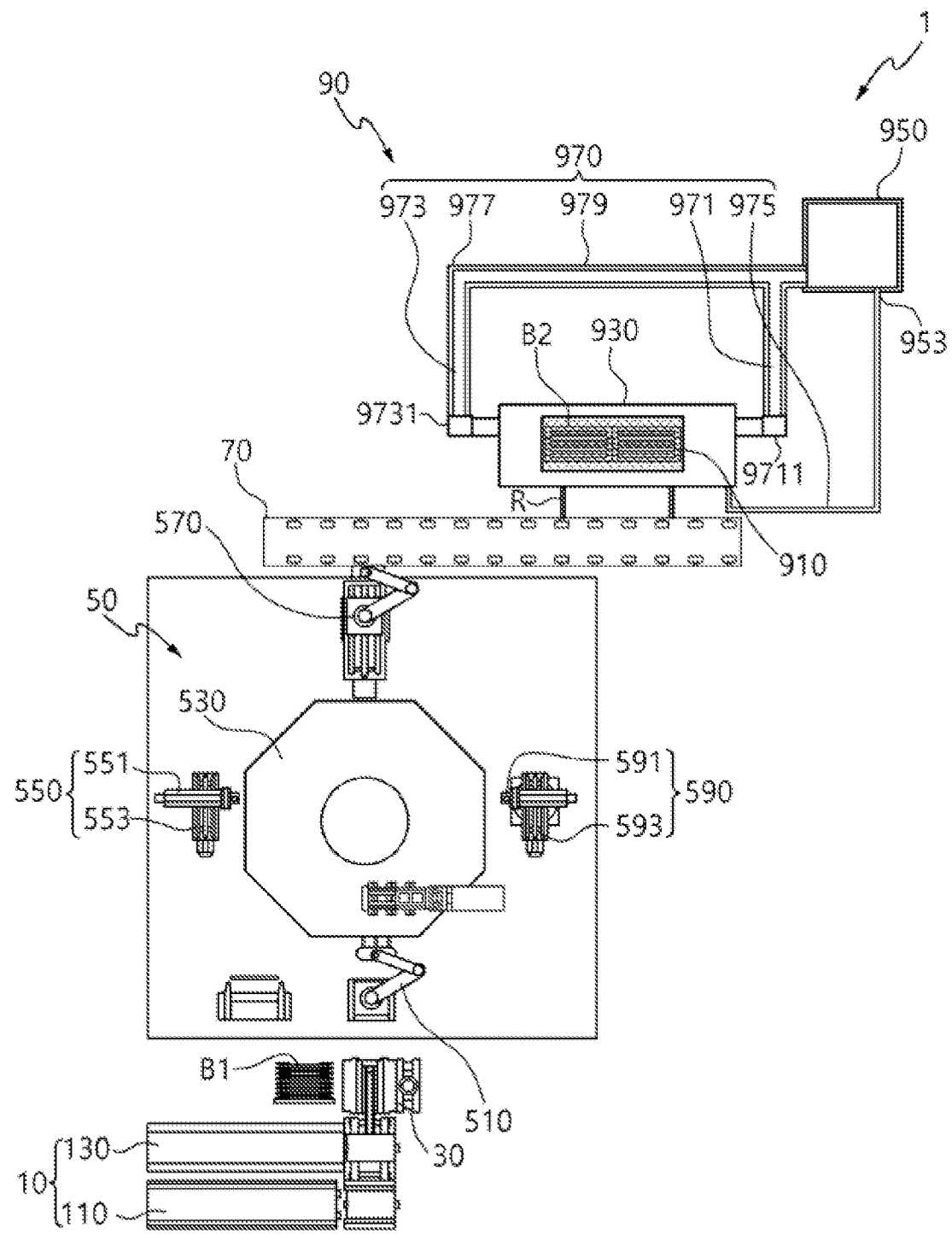

Then, referring to FIG. 14, with the operation of a pre-fill pump 9711, a fluid serving as a pressure transmitting medium in a storage tank 950 is supplied from a common pipe 979 to the inner space of the pressurizing chamber part 930 through a first pipe 971 and a second pipe 973. At this time, since a plurality of through-holes B22 are formed on an outer surface of the basket B2, the vacuum sealing unit 3 is immersed in the fluid.

Thereafter, the pressure in the pressurizing chamber part 930 is increased by the operation of an intensifier pump 9731. At this time, the fluid is maintained in a high temperature state by the operation of a first heating block 931 to minimize heat loss. In this manner, a high-temperature pressurization process is performed on the secondary battery 5.

Figure 15:
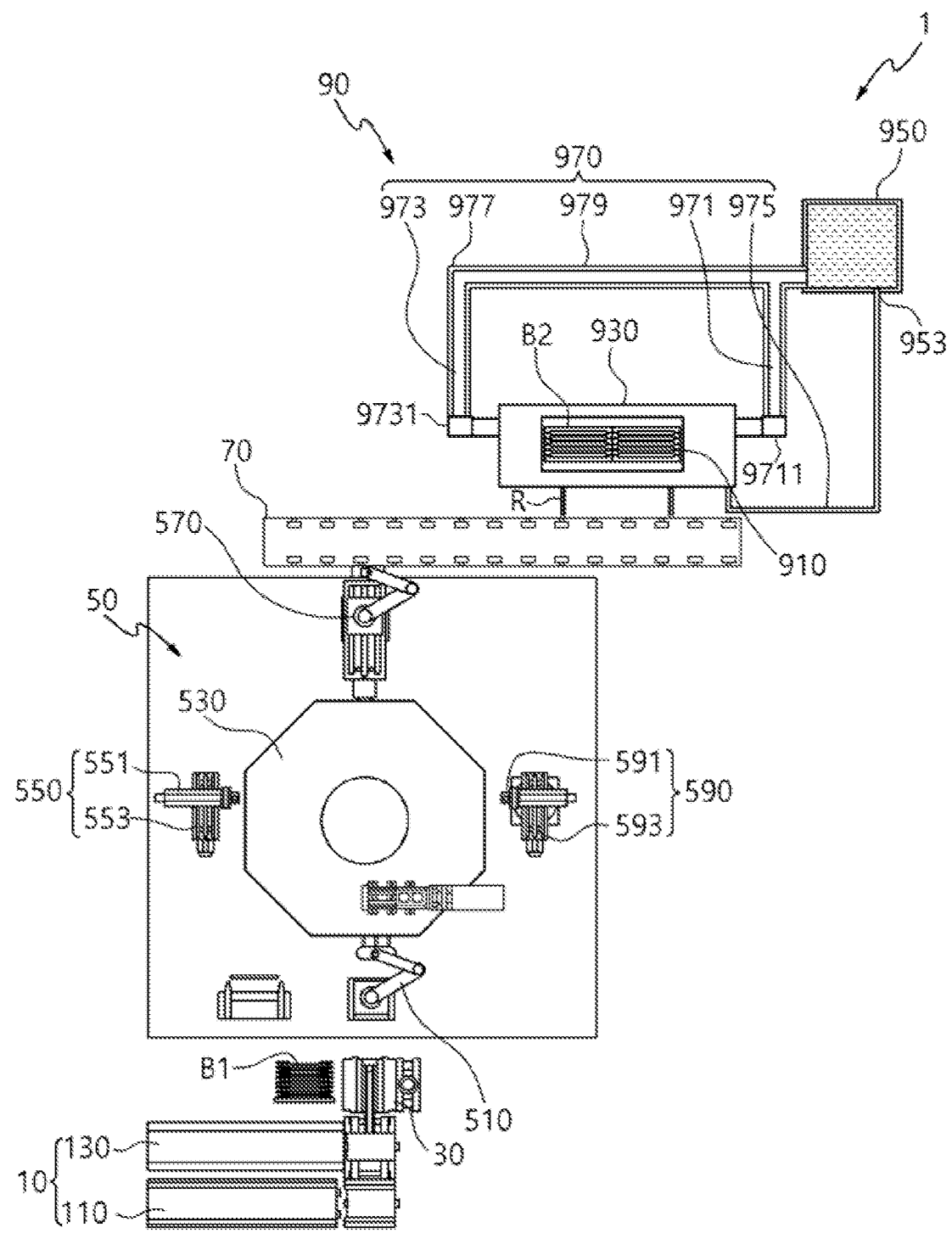

Then, referring to FIG. 15, with the operation of the pre-fill pump 9711, the fluid in the pressurizing chamber part 930 flows to the storage tank 950 through the first pipe 971 and the second pipe 973. After that, the first cover 932 and the second cover 933 opens the inlet 911 and the outlet 913 of the vessel 910. Then, the vessel 910 is discharged from the inner space of the pressurizing chamber part 930 through the rail R to a position adjacent to the second transfer unit 70. At this time, the fluid that has not escaped from the pressurizing chamber part 930 flows through a residue discharge pipe 975.

Figure 16:
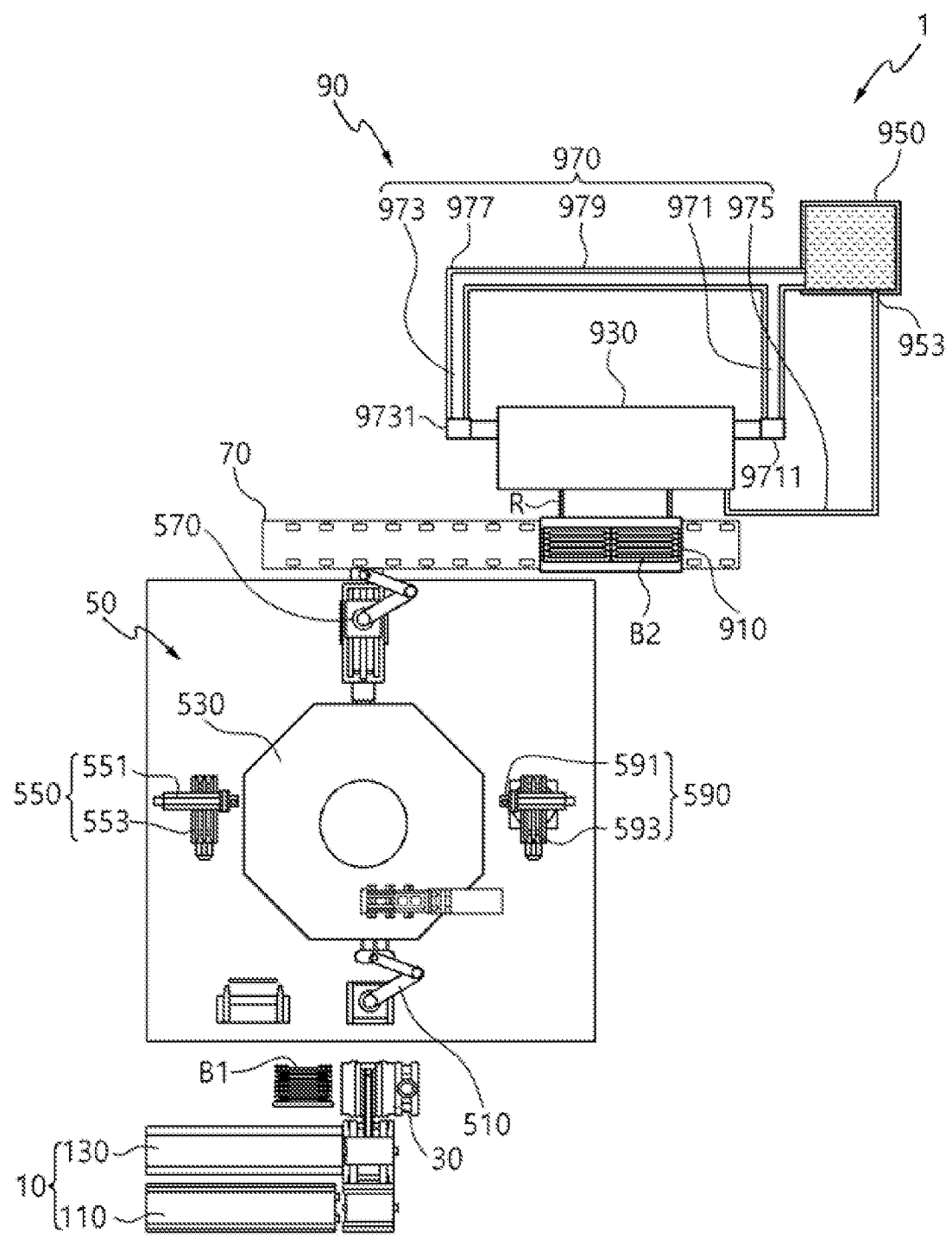

Then, referring to FIG. 16, the basket B2 in the vessel 910 is discharged to the second transfer unit 70. Thereafter, the second transfer unit 70 transfers the basket B2 to the automatic packing unit 50.

Figure 17:
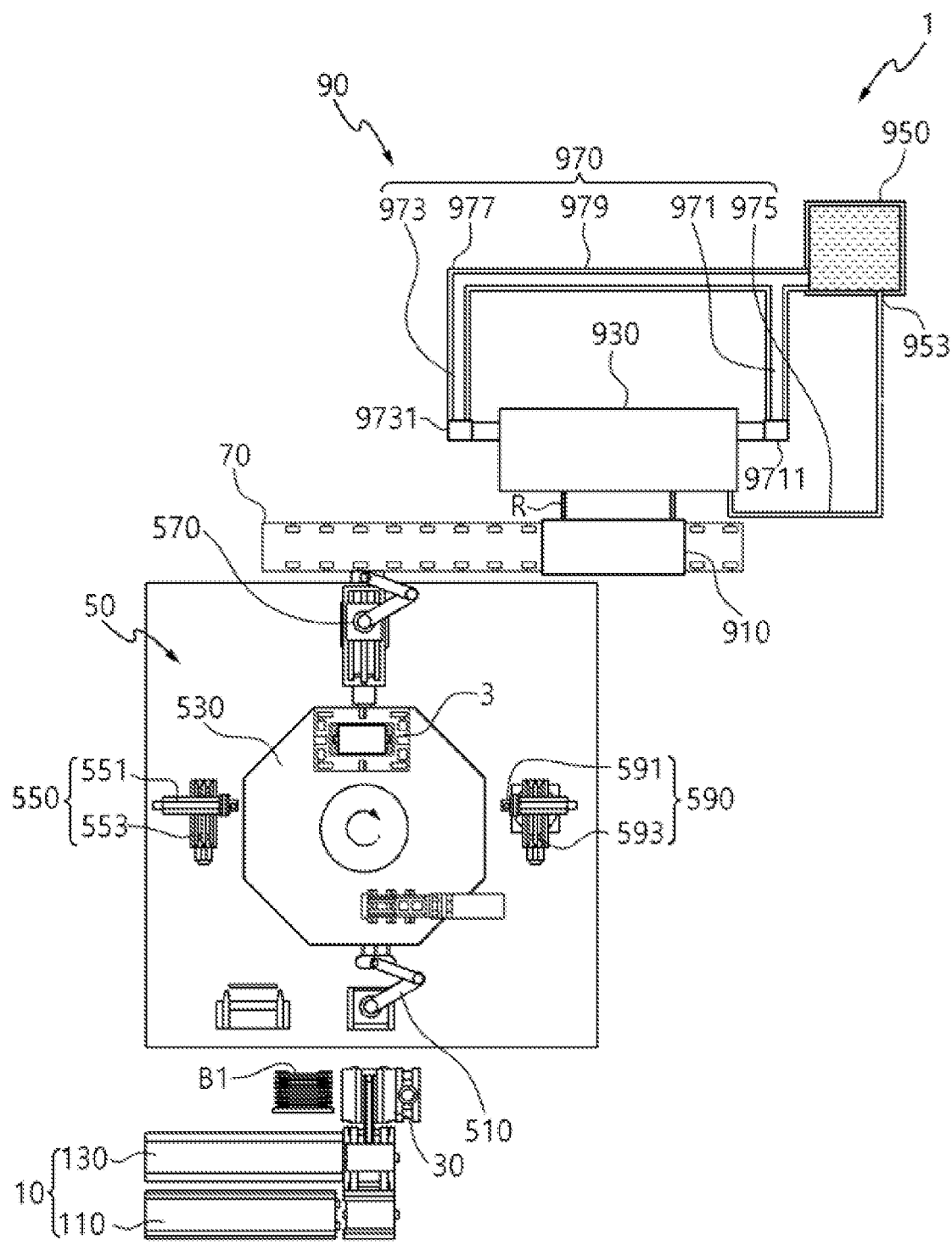
Figure 18:
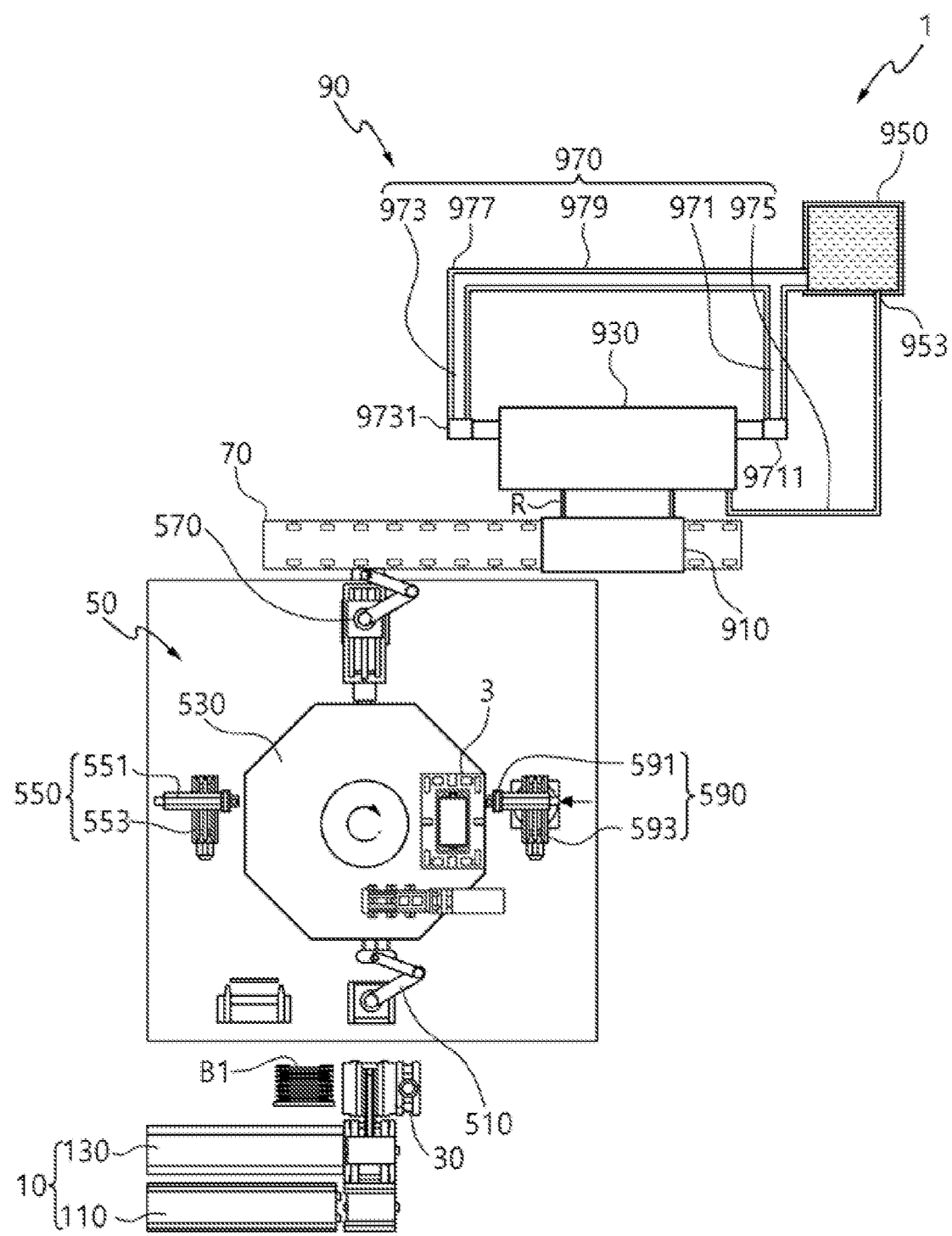

Then, referring to FIG. 17, the second supply device 570 places the vacuum sealing unit 3 in the basket B2 on the third position of the work table 530. Then, referring to FIG. 18, the work table 530 is rotated until the vacuum sealing unit 3 reaches a fourth position.

After that, a second flow path forming part 591 of a vacuum release device 590 is moved forward by a second actuating means 593 so that an inlet thereof communicates with the air inlet and outlet port of the vacuum sealing unit 3. Then, the vacuum in the inner space of the vacuum sealing unit 3 is released.

Figure 19:
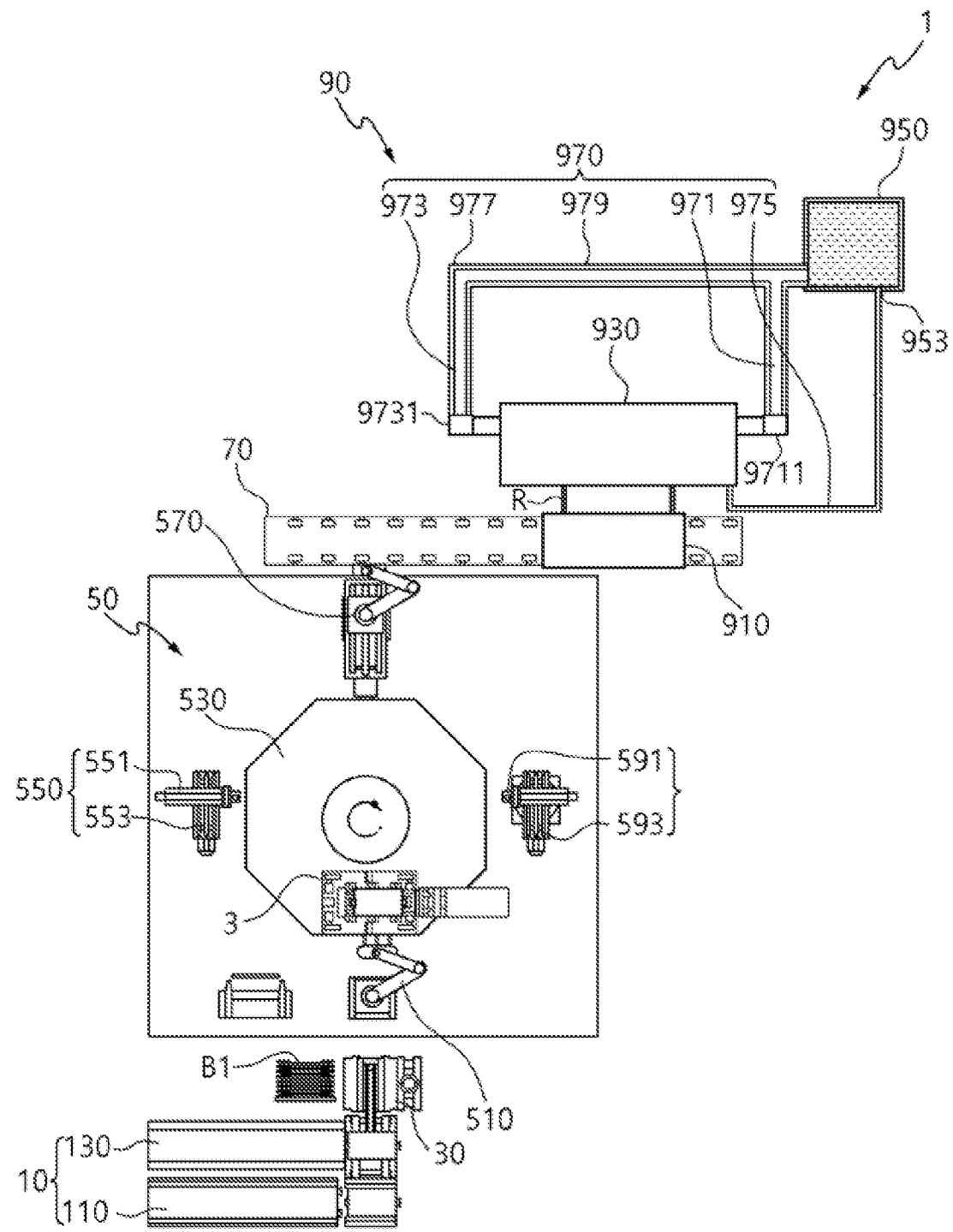

Then, referring to FIG. 19, after the work table 530 is rotated until the vacuum sealing unit 3 reaches the first position, the first supply device 510 unpacks the vacuum sealing unit 3. That is, the cover part 33 is disassembled from the base part 31 of the vacuum sealing unit 3. Thereafter, the first supply device 510 transfers the secondary battery 5 having been subjected to the pressurization process to the feeding unit 30 or stacks the secondary battery 5 on the buffer B1.

Figure 20:
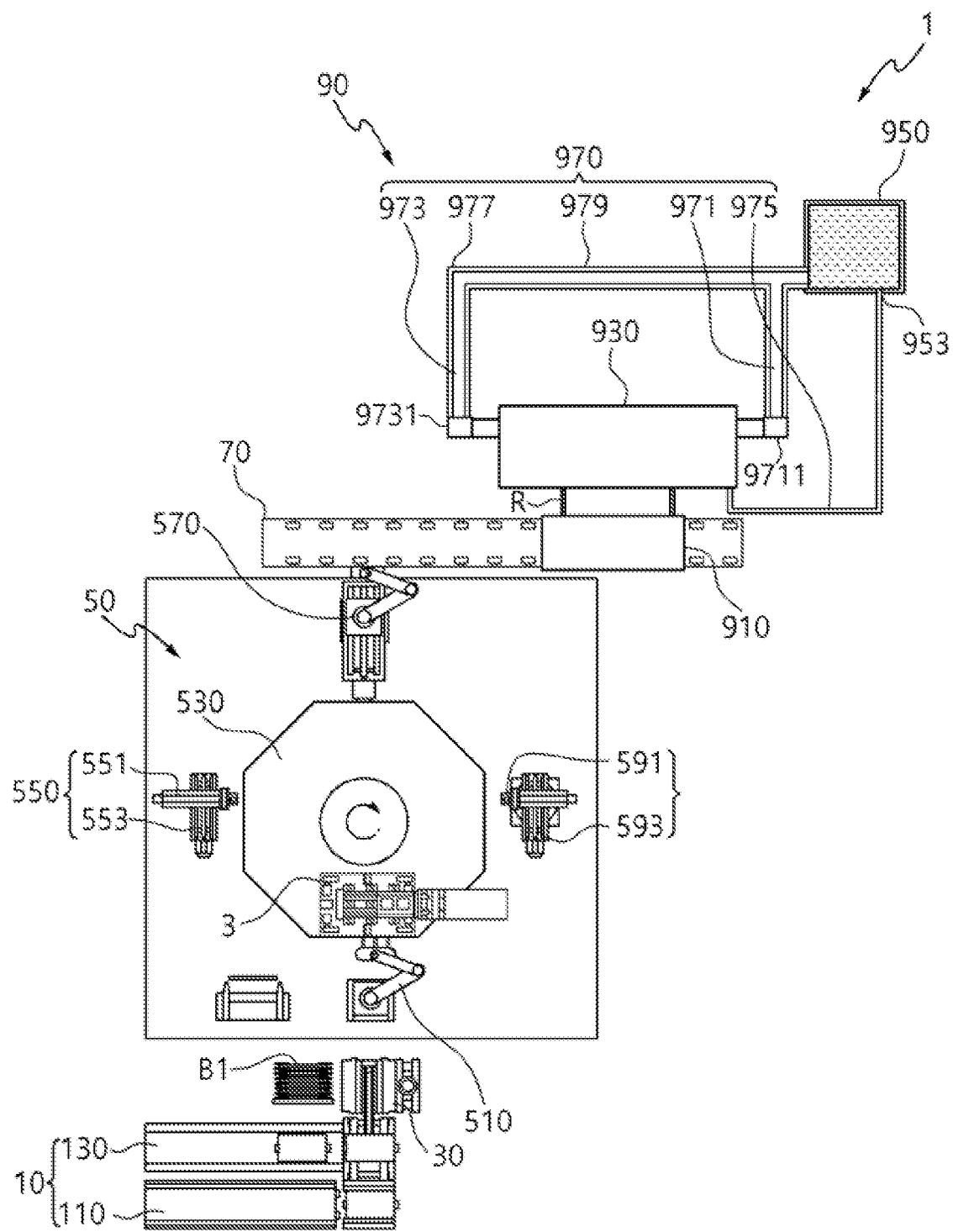

Finally, referring to FIG. 20, the secondary battery 5 having been subjected to the pressurization process is placed on the discharge part 130 by the operation of the feeding unit 30, and then discharged from the system 1 by the operation of the discharge part 130.

The foregoing detailed description may be merely an example of the present disclosure. Also, the inventive concept is explained by describing the preferred embodiments and will be used through various combinations, modifications, and environments. That is, the inventive concept may be amended or modified without departing from the scope of the technical idea and/or knowledge in the art. The foregoing embodiments are for illustrating the best mode for implementing the technical idea of the present disclosure, and various modifications may be made therein according to specific application fields and uses of the present disclosure. Therefore, the foregoing detailed description of the present disclosure is not intended to limit the inventive concept to the disclosed embodiments.

What is claimed is:

1. A system for pressurizing an all-solid-state secondary battery at high temperature, the system comprising:
a first transfer unit configured to transfer the all-solid-state secondary battery in forward and backward directions;
a vessel connected to a pressurizing chamber part on one side thereof, and configured to be moved laterally into an inner space of the pressurizing chamber part or moved laterally in an opposite direction to a standby position, the vessel comprising an inlet configured to allow the all-solid-state secondary battery to be inserted therein by the first transfer unit and an outlet configured to allow the all-solid-state secondary battery to be discharged therefrom;
the pressurizing chamber part having the inner space configured to allow the vessel to be inserted therein;
a storage tank configured to store a fluid serving as a pressure transmitting medium; and
a pipe part having a first end connected to the storage tank and a second end connected to the pressurizing chamber part.

2. The system of claim 1,
wherein the pressurizing chamber part comprises:
a first cover configured to open and close the inlet of the vessel; and
a second cover configured to open and close the outlet of the vessel.

3. The system of claim 2,
wherein the pressurizing chamber part further comprises:
a first through-hole configured to allow the fluid to be supplied into and discharged from the inner space of the pressurizing chamber part; and
a second through-hole configured to allow the fluid to be supplied into and discharged from the inner space of the pressurizing chamber part, and
wherein the pipe part comprises:
a first pipe having a first end in communication with the storage tank and a second end in communication with the first through-hole; and
a second pipe having a first end in communication with the storage tank and a second end in communication with the second through-hole.

4. The system of claim 3, wherein a pre-fill pump configured to supply the fluid into or discharge the fluid from the inner space of the pressurizing chamber part is disposed on one side of the first pipe, and an intensifier pump configured to increase a pressure in the inner space of the pressurizing chamber part is disposed on one side of the second pipe.

5. The system of claim 2,
wherein the pressurizing chamber part further comprises a first heating block positioned inside the pressurizing chamber part and configured to transfer heat to the fluid supplied from the storage tank.

6. The system of claim 3, wherein the pressurizing chamber part further comprises a fluid flow hole configured to allow the fluid remaining after a pressurization process is completed to be discharged therethrough, and the pipe part further comprises a residue discharge pipe having a first end in communication with the storage tank and a second end in communication with the fluid flow hole.

7. The system of claim 5, wherein the storage tank comprises a second heating block disposed on one side of the storage tank and configured to transfer heat to the fluid stored in the storage tank.

8. The system of claim 3, wherein the first pipe and the second pipe are branched from a common pipe in communication with the storage tank, and the pipe part further comprises a heating jacket on an outer surface of one side thereof.

9. The system of claim 1, further comprising:
a second transfer unit configured to transfer the all-solid-state secondary battery to a feeding unit;
the feeding unit configured to discharge the all-solid-state secondary battery into a vacuum sealing unit; and
an automatic packing unit configured to automatically pack the all-solid-state secondary battery discharged from the feeding unit into the vacuum sealing unit and further supply the all-solid-state secondary battery to the first transfer unit.

10. The system of claim 9,
wherein the automatic packing unit comprises:
a first supply device configured to place the all-solid-state secondary battery discharged through the feeding unit on a work table and automatically pack the all-solid-state secondary battery into the vacuum sealing unit;
the work table configured to be rotated;
a vacuum device configured to form a vacuum in an inner space of the vacuum sealing unit; and
a second supply device configured to supply the vacuum sealing unit under vacuum to the first transfer unit.

11. The system of claim 10, wherein the first supply device is disposed adjacent to a first position on the work table, the vacuum device is disposed adjacent to a second position on the work table, and the second supply device is disposed adjacent to a third position on the work table.

12. The system of claim 11, wherein the automatic packing unit further comprises a vacuum release device disposed adjacent to a fourth position on the work table and configured to release the vacuum in the inner space of the vacuum sealing unit.

13. The system of claim 9,
wherein the second transfer unit comprises:
a supply part configured to transfer the all-solid-state secondary battery to the feeding unit; and
a discharge part configured to receive the all-solid-state secondary battery discharged through the automatic packing unit through the feeding unit and transfer the all-solid-state secondary battery in a direction opposite to a transfer direction of the supply part.

14. A method of pressurizing an all-solid-state secondary battery at high temperature using the system of claim 10, the method comprising:

transferring the all-solid-state secondary battery to the feeding unit from the second transfer unit;
discharging, by the feeding unit, the all-solid-state secondary battery into the vacuum sealing unit;
packing, by the first supply device, the all-solid-state secondary battery into the vacuum sealing unit on the work table; and
forming, by the vacuum device, the vacuum in the inner space of the vacuum sealing unit.

15. The method of claim 14,
further comprising:
inserting, by the second supply device, the vacuum sealing unit under vacuum into a basket on the first transfer unit;
transferring, by the first transfer unit, the basket into which the vacuum sealing unit is inserted to the inner space of the pressurizing chamber part; and
pressurizing the all-solid-state secondary battery in the pressurizing chamber part.

* * * * *